US012707098B2

(12) United States Patent
Yin et al.

(10) Patent No.: US 12,707,098 B2
(45) Date of Patent: Aug. 11, 2026

(54) FILTER SHAPE SWITCH FOR ADAPTIVE LOOP FILTER IN VIDEO CODING

(71) Applicants: Beijing Bytedance Network Technology Co., Ltd, Beijing (CN); Bytedance Inc., Los Angeles, CA (US)

(72) Inventors: Wenbin Yin, Beijing (CN); Kai Zhang, San Diego, CA (US); Li Zhang, San Diego, CA (US)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 18/937,272

(22) Filed: Nov. 5, 2024

(65) Prior Publication Data

US 2025/0063206 A1 Feb. 20, 2025

Related U.S. Application Data

(63) Continuation of application No. PCT/CN2023/092264, filed on May 5, 2023.

(30) Foreign Application Priority Data

May 5, 2022 (WO) ................ PCT/CN2022/090923

(51) Int. Cl.

| | |
|---|---|
| ***H04N 19/00*** | (2014.01) |
| ***H04N 19/117*** | (2014.01) |
| ***H04N 19/70*** | (2014.01) |
| ***H04N 19/82*** | (2014.01) |
| ***H04N 19/96*** | (2014.01) |

(52) U.S. Cl.
CPC .......... *H04N 19/82* (2014.11); *H04N 19/117* (2014.11); *H04N 19/70* (2014.11); *H04N 19/96* (2014.11)

(58) Field of Classification Search
CPC .. H04N 19/117; H04N 19/167; H04N 19/176; H04N 19/184; H04N 19/70; H04N 19/91; H04N 19/82
See application file for complete search history.

(56) References Cited

U.S. PATENT DOCUMENTS

| | | | | |
|---|---|---|---|---|
| 6,519,369 | B1 | 2/2003 | Kondo et al. | |
| 10,708,622 | B2 * | 7/2020 | Budagavi | H04N 19/82 |
| 11,051,017 | B2 * | 6/2021 | Hu | H04N 19/463 |
| 2011/0274158 | A1 * | 11/2011 | Fu | H04N 19/134 375/E7.127 |

(Continued)

FOREIGN PATENT DOCUMENTS

| | | | |
|---|---|---|---|
| CN | 106209574 | A | 12/2016 |
| CN | 108196751 | A | 6/2018 |

(Continued)

OTHER PUBLICATIONS

Strom, J., et al., "Bilateral Loop Filter in Combination with SAO," in proceeding of IEEE Picture Coding Symposium (PCS), Nov. 2019, 5 pages.

(Continued)

*Primary Examiner* — Frank F Huang
(74) *Attorney, Agent, or Firm* — Conley Rose, P.C.

(57) ABSTRACT

A mechanism for processing video data is disclosed. A filter is applied to a video unit. The filter employs an extended tap for a first sample in the video unit and a spatial tap for a second sample in the video unit. A conversion is performed between a visual media data and a bitstream based on the video unit.

20 Claims, 19 Drawing Sheets

(56) References Cited

U.S. PATENT DOCUMENTS

| | | | | |
|---|---|---|---|---|
| 2012/0189064 | A1 | 7/2012 | Kossentini et al. | |
| 2012/0230431 | A1* | 9/2012 | Boyce | H04N 19/70 375/E7.026 |
| 2019/0188855 | A1* | 6/2019 | Mendes Rodrigues | G06T 7/11 |
| 2020/0344494 | A1* | 10/2020 | Hu | H04N 19/463 |
| 2020/0366891 | A1* | 11/2020 | Hu | H04N 19/70 |
| 2021/0160513 | A1* | 5/2021 | Hu | H04N 19/82 |
| 2021/0329272 | A1* | 10/2021 | Rusanovskyy | H04N 19/117 |
| 2022/0030232 | A1* | 1/2022 | Hu | H04N 19/86 |

FOREIGN PATENT DOCUMENTS

| | | | |
|---|---|---|---|
| CN | 109656656 | A | 4/2019 |
| CN | 110634168 | A | 12/2019 |
| CN | 114009018 | A | 2/2022 |
| WO | 2021088835 | A1 | 5/2021 |

OTHER PUBLICATIONS

Document: JVET-S2001-vH, Bross, B., et al., "Versatile Video Coding (Draft 10)," Joint Video Experts Team (JVET) of ITU-T SG 16 WP 3 and ISO/IEC JTC 1/SC 29/WG 11 19th Meeting: by teleconference, Jun. 22-Jul. 1, 2020.

https://vcgit.hhi.fraunhofer.de/jvet-u-ee2/VVCSoftware_VTM/-/tree/VTM-11.2, Dec. 2, 2024, 1 page.

Document: JVET-Y0148-v2, Yin, W., et al., "Non-EE2: Spatial-Temporal Adaptive Loop Filter," Joint Video Experts Team (JVET) of ITU-T SG 16 WP 3 and ISO/IEC JTC 1/SC 29 25th Meeting, by teleconference, Jan. 12-21, 2022, 3 pages.

Document: JVET-Y0147-v2, Yin, W., et al., "EE2-5.2: Adaptive Filter Shape Selection for ALF," Joint Video Experts Team (JVET) of ITU-T SG 16 WP 3 and ISO/IEC JTC 1/SC 29 25th Meeting, by teleconference, Jan. 12-21, 2022, 4 pages.

Chinese Office Action from Chinese Patent Application No. 202210762948.5 dated Oct. 31, 2024, 14 pages.

International Search Report from PCT Application No. PCT/CN2023/092264 dated Jul. 7, 2023, 4 pages.

Document: JVET-Z0149, Yin, W., et al., "Non-EE2: Adaptive Filter Shape Switch for ALF," Joint Video Experts Team (JVET) of ITU-T SG 16 WP 3 and ISO/IEC JTC 1/SC 29 26th Meeting, by teleconference, Apr. 20-29, 2022, 3 pages.

Extended European Search Report from European Patent Application No. 23799284.7 dated Jan. 29, 2026, 10 pages.

* cited by examiner

Spatial Taps

Extended Taps

Spatial Taps

Extended Taps

Spatial Taps Extended Taps

Spatial Taps Extended Taps

FILTER SHAPE SWITCH FOR ADAPTIVE LOOP FILTER IN VIDEO CODING

CROSS-REFERENCE TO RELATED APPLICATIONS

This application is a continuation of International Patent Application No. PCT/CN2023/092264, filed on May 5, 2023, which claims the priority to and benefits of International Patent Application PCT/CN2022/090923, filed on May 5, 2022. All of the aforementioned patent applications are hereby incorporated by reference in their entireties.

TECHNICAL FIELD

The present disclosure relates to generation, storage, and consumption of digital audio video media information in a file format.

BACKGROUND

Digital video accounts for the largest bandwidth used on the Internet and other digital communication networks. As the number of connected user devices capable of receiving and displaying video increases, the bandwidth demand for digital video usage is likely to continue to grow.

SUMMARY

A first aspect relates to a method for processing video data comprising: determining to apply a filter to a video unit, where the filter employs an extended tap for a first sample in the video unit and a spatial tap for a second sample in the video unit; and performing a conversion between a visual media data and a bitstream based on the video unit.

A second aspect relates to an apparatus for processing video data comprising: one or more processors and one or more non-transitory memories coupled to the one or more processors and storing instructions that, when executed by the one or more processors, cause the apparatus to be configured to determine to apply a filter to a video unit, where the filter employs an extended tap for a first sample in the video unit and a spatial tap for a second sample in the video unit; and perform a conversion between a visual media data and a bitstream based on the video unit.

A third aspect relates to a non-transitory computer-readable medium comprising a computer program product for use by a video coding device, the computer program product comprising computer executable instructions stored on the non-transitory computer readable medium that, when executed by one or more processors, cause the video coding device to be configured to determine to apply a filter to a video unit, where the filter employs an extended tap for a first sample in the video unit and a spatial tap for a second sample in the video unit; and perform a conversion between a visual media data and a bitstream based on the video unit.

A fourth aspect relates to a non-transitory computer-readable recording medium storing a bitstream of a video which is generated by a method performed by a video processing apparatus, wherein the method comprises: determining to apply a filter to a video unit, where the filter employs an extended tap for a first sample in the video unit and a spatial tap for a second sample in the video unit; and generating the bitstream based on the determining.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

For a more complete understanding of this disclosure, reference is now made to the following brief description, taken in connection with the accompanying drawings and detailed description, wherein like reference numerals represent like parts.

DETAILED DESCRIPTION

Figure 1:
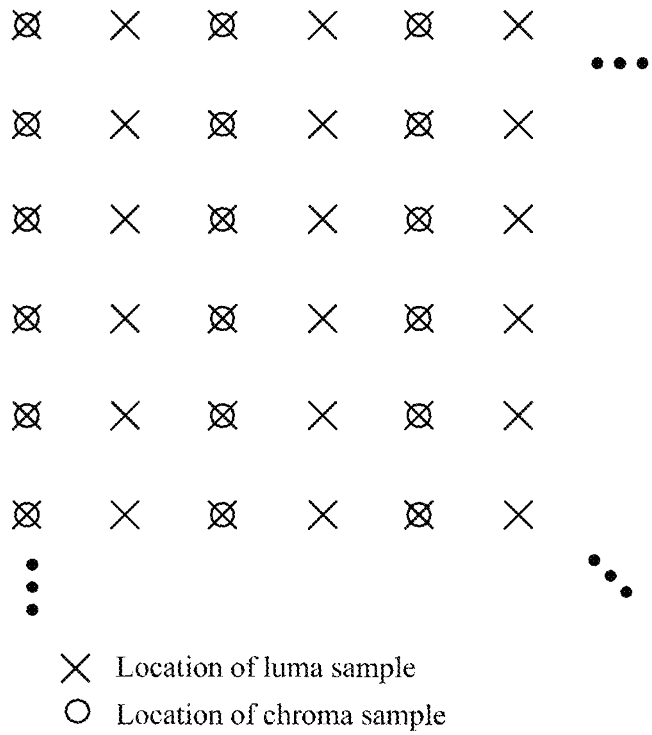
FIG. 1 illustrates an example of nominal vertical and horizontal locations of 4:2:2 luma and chroma samples in a picture.

It should be understood at the outset that although an illustrative implementation of one or more embodiments are provided below, the disclosed systems and/or methods may be implemented using any number of techniques, whether currently known or yet to be developed. The disclosure should in no way be limited to the illustrative implementations, drawings, and techniques illustrated below, including the exemplary designs and implementations illustrated and described herein, but may be modified within the scope of the appended claims along with their full scope of equivalents.

Section headings are used in the present disclosure for ease of understanding and do not limit the applicability of techniques and embodiments disclosed in each section only to that section. Furthermore, the techniques described herein are applicable to other video codec protocols and designs.

1. Initial Discussion

This disclosure is related to video coding technologies. Specifically, it is related to in-loop filter and other coding tools in image/video coding. The ideas may be applied individually or in various combinations to video codecs, such as High Efficiency Video Coding (HEVC), Versatile Video Coding (VVC), or other video coding technologies.

2. Abbreviations

The present disclosure includes the following abbreviations. Advanced video coding (Rec. ITU-T H.264|ISO/IEC 14496-10) (AVC), coded picture buffer (CPB), clean random access (CRA), coding tree unit (CTU), coded video sequence (CVS), decoded picture buffer (DPB), decoding parameter set (DPS), general constraints information (GCI), high efficiency video coding, also known as Rec. ITU-T H.265|ISO/IEC 23008-2, (HEVC), Joint exploration model (JEM), motion constrained tile set (MCTS), network abstraction layer (NAL), output layer set (OLS), picture header (PH), picture parameter set (PPS), profile, tier, and level (PTL), picture unit (PU), reference picture resampling (RPR), raw byte sequence payload (RBSP), supplemental enhancement information (SEI), slice header (SH), sequence parameter set (SPS), video coding layer (VCL), video parameter set (VPS), versatile video coding, also known as Rec. ITU-T H.266|ISO/IEC 23090-3, (VVC), VVC test model (VTM), video usability information (VUI), transform unit (TU), coding unit (CU), deblocking filter (DF), sample adaptive offset (SAO), adaptive loop filter (ALF), coding block flag (CBF), quantization parameter (QP), rate distortion optimization (RDO), and bilateral filter (BF).

3. Video Coding Standards

Video coding standards have evolved primarily through the development of the International Telecommunication Union-Telecommunication Standardization Sector (ITU-T) and International Organization for Standardization (ISO)/International Electrotechnical Commission (IEC) standards. The ITU-T produced H.261 and H.263, ISO/IEC produced Moving Picture Experts Group (MPEG)-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, the Joint Video Exploration Team (JVET) was founded by Video Coding Experts Group (VCEG) and MPEG jointly. Many methods have been adopted by JVET and put into the reference software named Joint Exploration Model (JEM) [2]. The JVET was renamed to be the Joint Video Experts Team (JVET) when the Versatile Video Coding (VVC) project officially started. VVC is a coding standard, targeting at 50% bitrate reduction as compared to HEVC. The VVC working draft and VVC test model (VTM) are continuously updated.

International Telecommunication Union Telecommunication Standardization Sector (ITU-T) video coding experts group (VCEG) and International Organization for Standardization and the International Electrotechnical Commission (ISO/IEC) Moving Picture Experts Group (MPEG) joint technical committee (JTC) 1/subcommittee (SC) 29/working group (WG) 11 are studying the potential need for standardization of future video coding technology with a compression capability that significantly exceeds that of the current VVC standard. Such future standardization action could either take the form of additional extension(s) of VVC or an entirely new standard. The groups are working together on this exploration activity in a joint-collaboration effort known as the Joint Video Exploration Team (JVET) to evaluate compression technology designs proposed by their experts in this area. The first Exploration Experiments (EE) are established by JVET and reference software named Enhanced Compression Model (ECM) is in use. The test model ECM is updated continuously.

3.1 Color Space and Chroma Subsampling

Color space, also known as the color model (or color system), is a mathematical model which describes the range of colors as tuples of numbers, for example as 3 or 4 values or color components (e.g., RGB). Generally speaking, a color space is an elaboration of the coordinate system and sub-space. For video compression, the most frequently used color spaces are luma, blue difference chroma, and red difference chroma (YCbCr) and red, green, blue (RGB).

YCbCr, Y'CbCr, or Y Pb/Cb Pr/Cr, also written as YCBCR or Y'CBCR, is a family of color spaces used as a part of the color image pipeline in video and digital photography systems. Y' is the luma component and CB and CR are the blue-difference and red-difference chroma components. Y' (with prime) is distinguished from Y, which is luminance, meaning that light intensity is nonlinearly encoded based on gamma corrected RGB primaries.

Chroma subsampling is the practice of encoding images by implementing less resolution for chroma information than for luma information, taking advantage of the human visual system's lower acuity for color differences than for luminance.

3.1.1 4:4:4

In 4:4:4, each of the three Y'CbCr components have the same sample rate. Thus there is no chroma subsampling. This scheme is sometimes used in high-end film scanners and cinematic postproduction.

3.1.2 4:2:2

In 4:2:2, the two chroma components are sampled at half the sample rate of luma. The horizontal chroma resolution is halved while the vertical chroma resolution is unchanged. This reduces the bandwidth of an uncompressed video signal by one-third with little to no visual difference. An example of nominal vertical and horizontal locations of 4:2:2 color format is depicted in FIG. 1.

3.1.3 4:2:0

In 4:2:0, the horizontal sampling is doubled compared to 4:1:1, but as the Cb and Cr channels are only sampled on each alternate line in this scheme, the vertical resolution is halved. The data rate is thus the same. Cb and Cr are each subsampled at a factor of 2 both horizontally and vertically. There are three variants of 4:2:0 schemes, having different horizontal and vertical siting. In MPEG-2, Cb and Cr are cosited horizontally. Cb and Cr are sited between pixels in the vertical direction (sited interstitially). In Joint Photographic Experts Group (JPEG)/JPEG File Interchange Format (JFIF), H.261, and MPEG-1, Cb and Cr are sited interstitially, halfway between alternate luma samples. In 4:2:0 DV, Cb and Cr are co-sited in the horizontal direction. In the vertical direction, they are co-sited on alternating lines.

TABLE 1

SubWidthC and SubHeightC values derived from chroma_format_idc and separate_colour_plane_flag

| chroma_format_idc | separate_colour_plane_flag | Chroma format | SubWidthC | SubHeightC |
|---|---|---|---|---|
| 0 | 0 | Monochrome | 1 | 1 |
| 1 | 0 | 4:2:0 | 2 | 2 |
| 2 | 0 | 4:2:2 | 2 | 1 |
| 3 | 0 | 4:4:4 | 1 | 1 |
| 3 | 1 | 4:4:4 | 1 | 1 |

3.2 Example Coding Flow of a Video Codec

Figure 2:
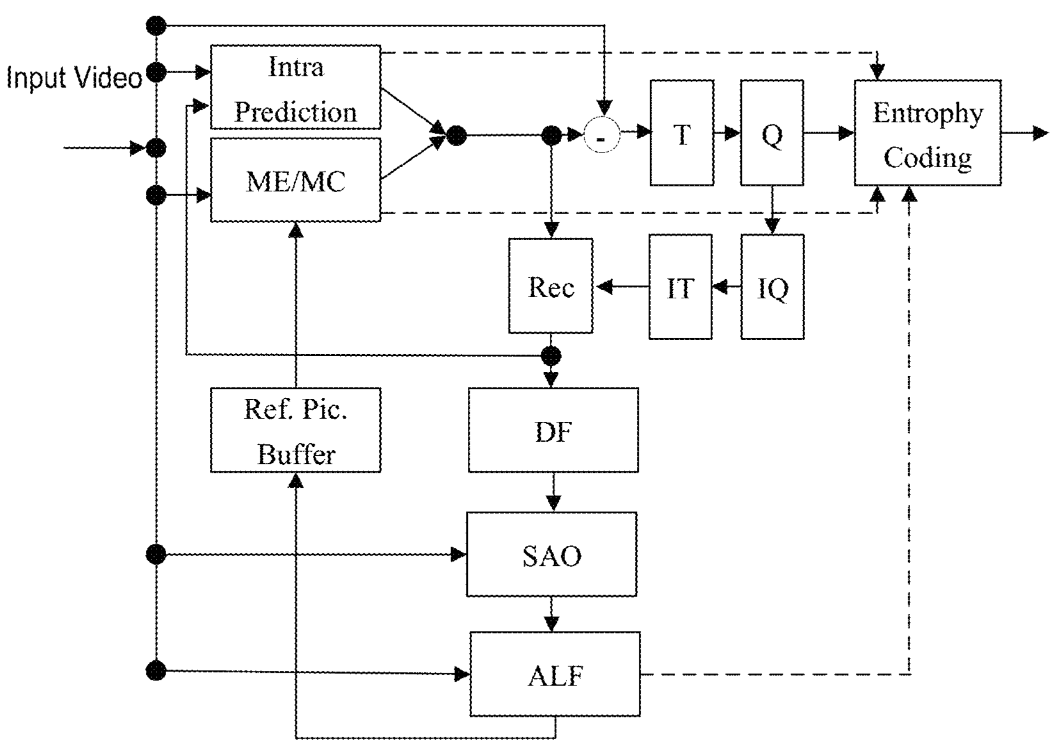
FIG. 2 illustrates an example encoder block diagram.

FIG. 2 shows an example of encoder block diagram of VVC, which contains three in-loop filtering blocks: deblocking filter (DF), sample adaptive offset (SAO) and ALF. Unlike DF, which uses predefined filters, SAO and ALF utilize the original samples of the current picture to reduce the mean square errors between the original samples and the reconstructed samples by adding an offset and by applying a finite impulse response (FIR) filter, respectively, with coded side information signaling the offsets and filter coefficients. ALF is located at the last processing stage of each picture and can be regarded as a tool trying to catch and fix artifacts created by the previous stages.

3.3 Definitions of Video/Coding Units

A picture is divided into one or more tile rows and one or more tile columns. A tile is a sequence of CTUs that covers a rectangular region of a picture. A tile may be divided into one or more bricks, each of which includes a number of CTU rows within the tile. A tile that is not partitioned into multiple bricks may also be referred to as a brick. However, a brick that is a true subset of a tile may not be referred to as a tile. A slice either contains several tiles of a picture or several bricks of a tile.

Figure 3:
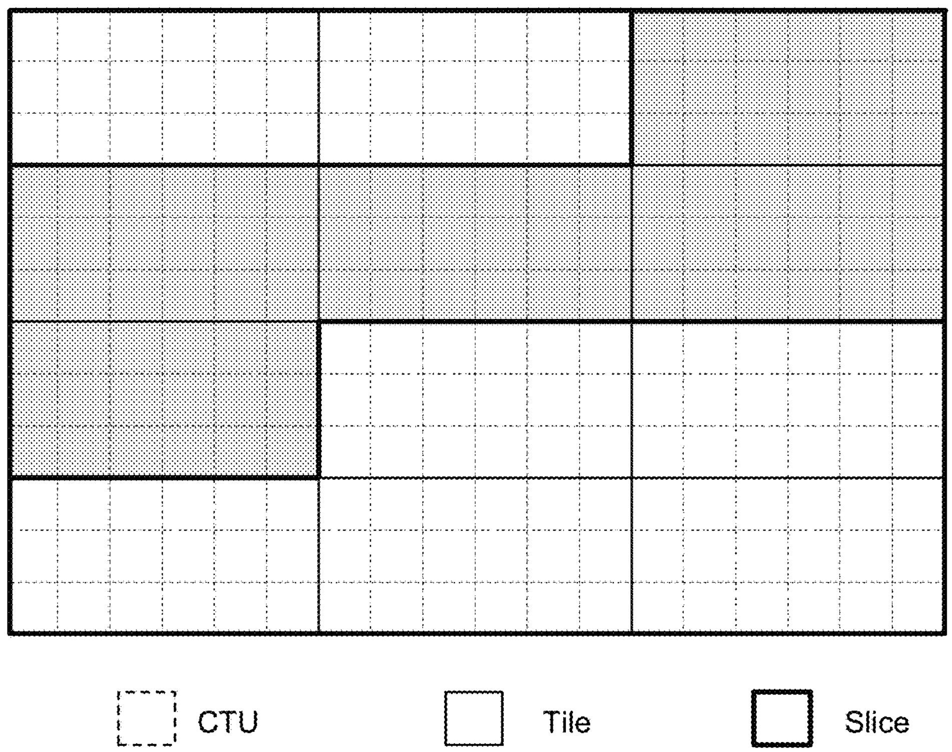
FIG. 3 illustrates an example picture partitioned into raster scan slices.

Two modes of slices are supported, namely the raster-scan slice mode and the rectangular slice mode. In the raster-scan slice mode, a slice contains a sequence of tiles in a tile raster scan of a picture. In the rectangular slice mode, a slice contains a number of bricks of a picture that collectively form a rectangular region of the picture. The bricks within a rectangular slice are in the order of brick raster scan of the slice. FIG. 3 shows an example of raster-scan slice partitioning of a picture, where the picture is divided into 12 tiles and 3 raster-scan slices.

Figure 4:
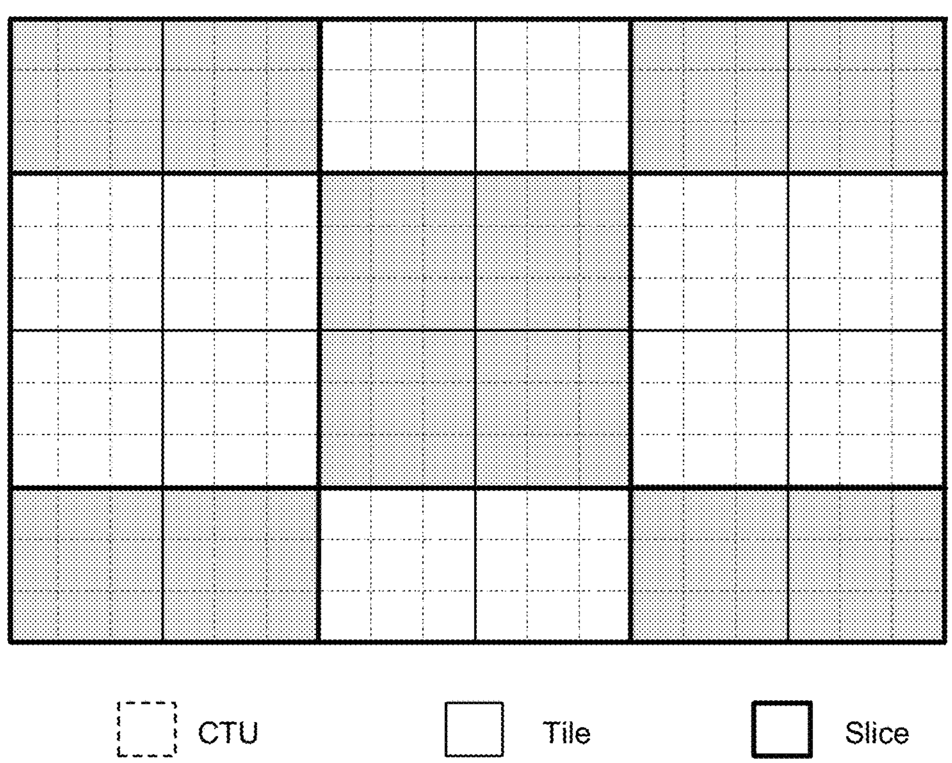
FIG. 4 illustrates an example picture partitioned into rectangular scan slices.

FIG. 4 shows an example of rectangular slice partitioning of a picture, where the picture is divided into 24 tiles (6 tile columns and 4 tile rows) and 9 rectangular slices.

Figure 5:
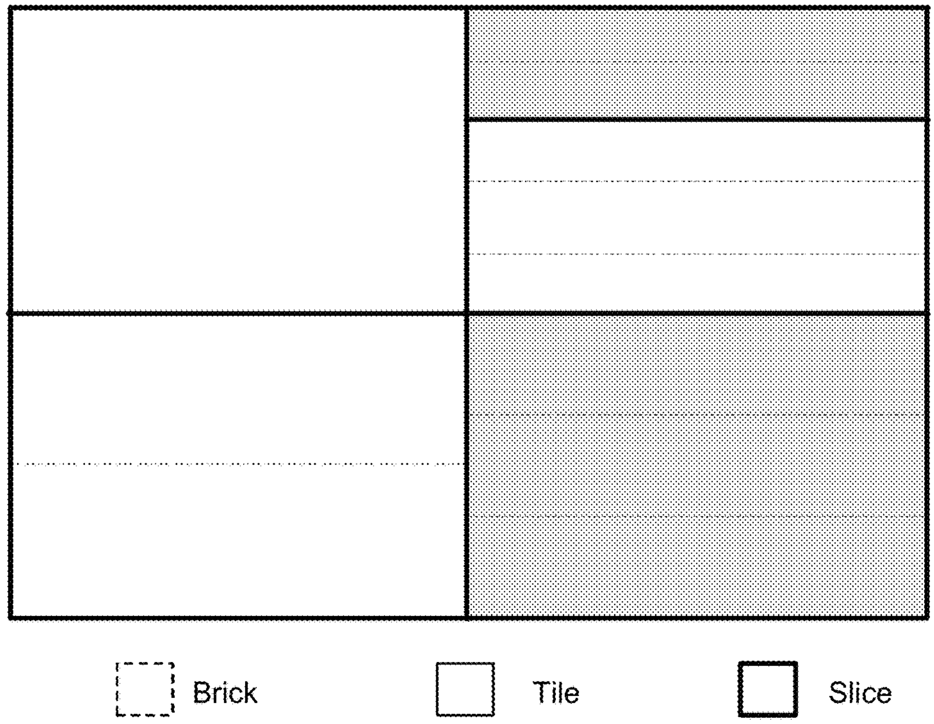
FIG. 5 illustrates an example picture partitioned into bricks.

FIG. 5 shows an example of a picture partitioned into tiles, bricks, and rectangular slices, where the picture is divided into 4 tiles (2 tile columns and 2 tile rows), 11 bricks (the top-left tile contains 1 brick, the top-right tile contains 5 bricks, the bottom-left tile contains 2 bricks, and the bottom-right tile contain 3 bricks), and 4 rectangular slices.

3.3.1 CTU/CTB Sizes

In VVC, the CTU size, signaled in a sequence parameter set (SPS) by the syntax element log2_ctu_size_minus2, could be as small as 4×4.

7.3.2.3 Sequence Parameter Set RBSP Syntax

| | Descriptor |
|---|---|
| seq_parameter_set_rbsp( ) { | |
| sps_decoding_parameter_set_id | u(4) |
| sps_video_parameter_set_id | u(4) |
| sps_max_sub_layers_minus1 | u(3) |
| sps_reserved_zero_5bits | u(5) |
| profile_tier_level( sps_max_sub_layers_minus1 ) | |
| gra_enabled_flag | u(1) |
| sps_seq_parameter_set_id | ue(v) |
| chroma_format_idc | ue(v) |
| if( chroma_format_idc = = 3 ) | |
| separate_colour_plane_flag | u(1) |
| pic_width_in_luma_samples | ue(v) |
| pic_height_in_luma_samples | ue(v) |
| conformance_window_flag | u(1) |
| if( conformance_window_flag ) { | |
| conf_win_left_offset | ue(v) |
| conf_win_right_offset | ue(v) |
| conf_win_top_offset | ue(v) |
| conf_win_bottom_offset | ue(v) |
| } | |
| bit_depth_luma_minus8 | ue(v) |
| bit_depth_chroma_minus8 | ue(v) |
| log2_max_pic_order_cnt_lsb_minus4 | ue(v) |
| sps_sub_layer_ordering_info_present_flag | u(1) |
| for( i = ( sps_sub_layer_ordering_info_present_flag ? 0 : sps_max_sub_layers_minus1 ); | |
| i <= sps_max_sub_layers_minus1; i++ ) { | |

-continued

| | Descriptor |
|---|---|
| sps_max_dec_pic_buffering_minus1[ i ] | ue(v) |
| sps_max_num_reorder_pics[ i ] | ue(v) |
| sps_max_latency_increase_plus1[ i ] | ue(v) |
| } | |
| long_term_ref_pics_flag | u(1) |
| sps_idr_rpl_present_flag | u(1) |
| rpl1_same_as_rpl0_flag | u(1) |
| for( i= 0; i < !rpl1_same_as_rpl0_flag ? 2 : 1; i++ ) { | |
| num_ref_pic_lists_in_sps[ i ] | ue(v) |
| for( j = 0; j < num_ref_pic_lists_in_sps[ i ]; j++) | |
| ref_pic_list_struct( i, j ) | |
| } | |
| qtbtt_dual_tree_intra_flag | u(1) |
| log2_ctu_size_minus2 | ue(v) |
| log2_min_luma_coding_block_size_minus2 | ue(v) |
| partition_constraints_override_enabled_flag | u(1) |
| sps_log2_diff_min_qt_min_cb_intra_slice_luma | ue(v) |
| sps_log2_diff_min_qt_min_cb_inter_slice | ue(v) |
| sps_max_mtt_hierarchy_depth_inter_slice | ue(v) |
| sps_max_mtt_hierarchy_depth_intra_slice_luma | ue(v) |
| if( sps_max_mtt_hierarchy_depth_intra_slice_luma != 0 ) { | |
| sps_log2_diff_max_bt_min_qt_intra_slice_luma | ue(v) |
| sps_log2_diff_max_tt_min_qt_intra_slice_luma | ue(v) |
| } | |
| if( sps_max_mtt_hierarchy_depth_inter_slices != 0 ) { | |
| sps_log2_diff_max_bt_min_qt_inter_slice | ue(v) |
| sps_log2_diff_max_tt_min_qt_inter_slice | ue(v) |
| } | |
| if( qtbtt_dual_tree_intra_flag ) { | |
| sps_log2_diff_min_qt_min_cb_intra_slice_chroma | ue(v) |
| sps_max_mtt_hierarchy_depth_intra_slice_chroma | ue(v) |
| if ( sps_max_mtt_hierarchy_depth_intra_slice_chroma != 0 ) { | |
| sps_log2_diff_max_bt_min_qt_intra_slice_chroma | ue(v) |
| sps_log2_diff_max_tt_min_qt_intra_slice_chroma | ue(v) |
| } | |
| } | |
| ... | |
| rbsp_trailing_bits( ) | |
| } | |

log2_ctu_size_minus2 plus 2 specifies the luma coding tree block size of each CTU. log2_min_luma_coding_block_size_minus2 plus 2 specifies the minimum luma coding block size. The variables CtbLog2SizeY, CtbSizeY, MinCbLog2SizeY, MinCbSizeY, MinTbLog2SizeY, MaxTbLog2SizeY, MinTbSizeY, MaxTbSizeY, PicWidthInCtbsY, PicHeightInCtbsY, PicSizeInCtbsY, PicWidthInMinCbsY, PicHeightInMinCbsY, PicSizeInMinCbsY, PicSizeInSamplesY, PicWidthInSamplesC and PicHeightInSamplesC are derived as follows:

$$CtbLog2SizeY = log2\_ctu\_size\_minus2 + 2 \quad (7\text{-}9)$$

$$CtbSizeY = 1 \ll CtbLog2SizeY \quad (7\text{-}10)$$

$$MinCbLog2SizeY = log\_min\_luma\_coding\_block\_size\_minus2 + 2 \quad (7\text{-}11)$$

$$MinCbSizeY = 1 \ll MinCbLog2SizeY \quad (7\text{-}12)$$

$$MinTbLog2SizeY = 2 \quad (7\text{-}13)$$

$$MaxTbLog2SizeY = 6 \quad (7\text{-}14)$$

$$MinTbSizeY = 1 \ll MinTbLog2SizeY \quad (7\text{-}15)$$

$$MaxTbSizeY = 1 \ll MaxTbLog2SizeY \quad (7\text{-}16)$$

$$PicWidthInCtbsY = Ceil(pic\_width\_in\_luma\_samples \div CtbSizeY) \quad (7\text{-}17)$$

-continued $$PicHeightInCtbsY = Ceil(pic\_height\_in\_luma\_samples \div CtbSizeY) \quad (7\text{-}18)$$

$$PicSizeInCtbsY = PicWidthInCtbsY * PicHeightInCtbsY \quad (7\text{-}19)$$

$$PicWidthInMinCbsY = pic\_width\_in\_luma\_samples / MinCbSizeY \quad (7\text{-}20)$$

$$PicHeightInMinCbsY = pic\_height\_in\_luma\_samples / MinCbSizeY \quad (7\text{-}21)$$

$$PicSizeInMinCbsY = PicWidthInMinCbsY * PicHeightInMinCbsY \quad (7\text{-}22)$$

$$PicSizeInSamplesY = pic\_width\_in\_luma\_samples * pic\_height\_in\_luma\_samples \quad (7\text{-}23)$$

$$PicWidthInSamplesC = pic\_width\_in\_luma\_samples / SubWidthC \quad (7\text{-}24)$$

$$PicHeightInSamplesC = pic\_height\_in\_luma\_samples / SubHeightC \quad (7\text{-}25)$$

3.3.2 CTUs in One Picture

Figure 6:
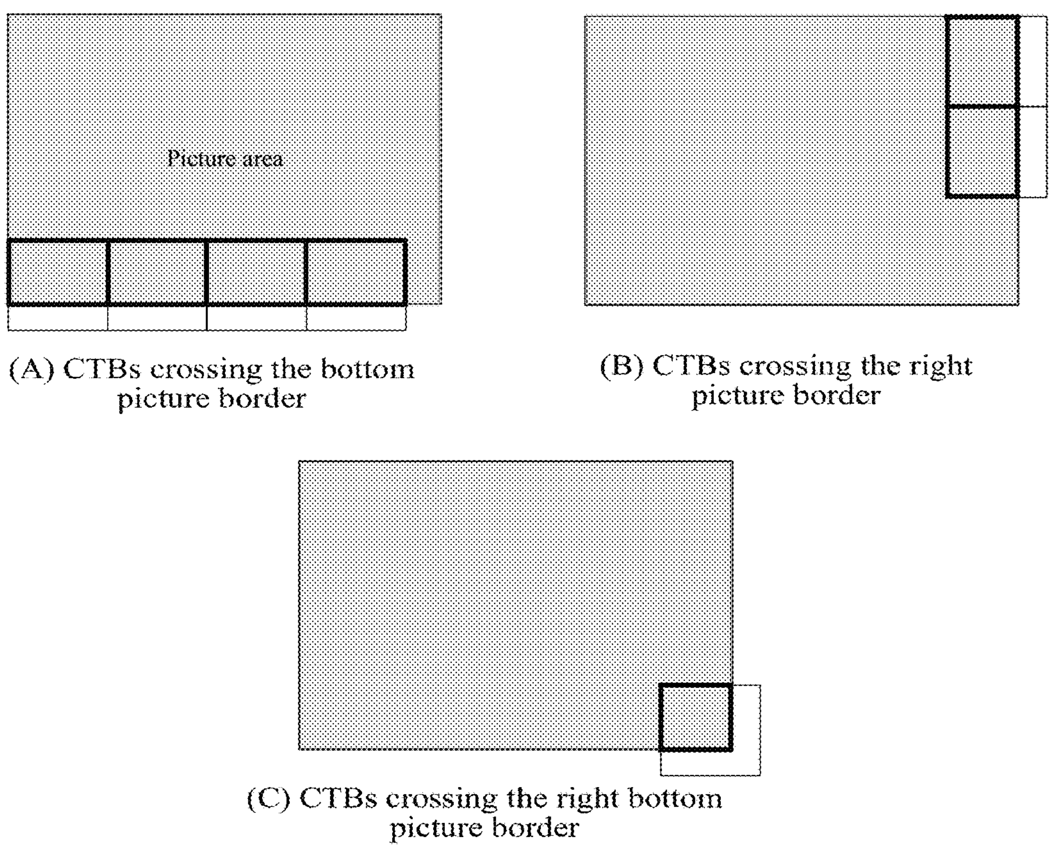
FIG. 6 illustrates an example of coding tree blocks (CTBs) crossing picture borders.

Suppose the CTB/largest coding unit (LCU) size indicated by M×N (typically M is equal to N), and for a CTB located at picture border (or tile or slice or other types of borders, picture border is taken as an example) border, K×L samples are within picture border wherein either K<M or L<N. For those CTBs as depicted in FIG. 6, the CTB size is still equal to M×N; however, the bottom boundary/right boundary of the CTB is outside the picture.

3.4 Intra Prediction

Figure 7:
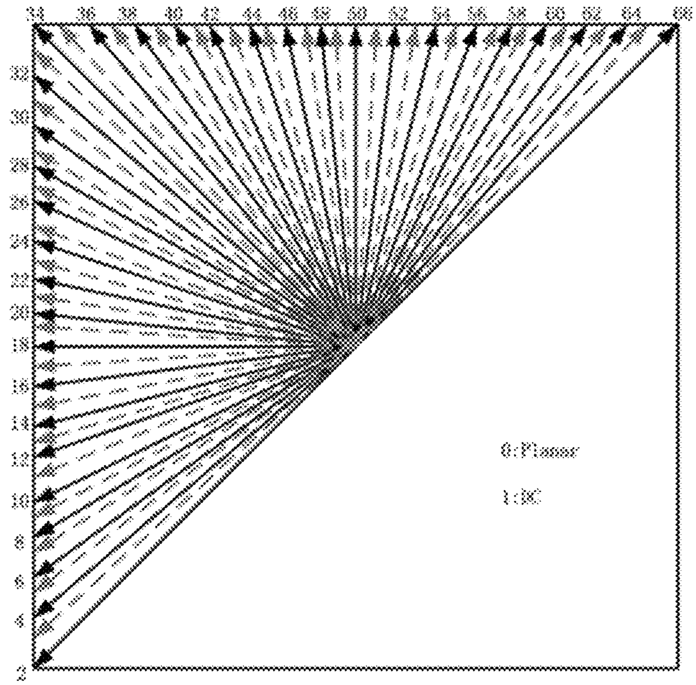
FIG. 7 illustrates an example of intra prediction modes.

To capture the arbitrary edge directions presented in natural video, the number of directional intra modes is extended from 33, as used in HEVC, to 65. The additional directional modes are depicted in FIG. 7, and the planar and direct current (DC) modes remain the same. These denser directional intra prediction modes apply for all block sizes and for both luma and chroma intra predictions.

Angular intra prediction directions may be defined from 45 degrees to −135 degrees in clockwise direction as shown in FIG. 7. In VTM, several angular intra prediction modes are adaptively replaced with wide-angle intra prediction modes for the non-square blocks. The replaced modes are signaled and remapped to the indexes of wide angular modes after parsing. The total number of intra prediction modes is unchanged, e.g., 67, and the intra mode coding is unchanged.

In the HEVC, every intra-coded block has a square shape and the length of each of the block's sides is a power of 2. Thus, no division operations are required to generate an intra-predictor using DC mode. In VVC, blocks can have a rectangular shape that necessitates the use of a division operation per block in the general case. To avoid division operations for DC prediction, only the longer side is used to compute the average for non-square blocks.

3.5 Inter Prediction

For each inter-predicted CU, motion parameters include motion vectors, reference picture indices, reference picture list usage index, and additional information used for the new coding feature of VVC to be used for inter-predicted sample generation. The motion parameters can be signaled in an explicit or implicit manner. When a CU is coded with skip mode, the CU is associated with one PU and has no significant residual coefficients, no coded motion vector delta, and/or reference picture index. A merge mode is specified whereby the motion parameters for the current CU are obtained from neighboring CUs, including spatial and temporal candidates, and additional schedules introduced in VVC. The merge mode can be applied to any inter-predicted CU, not only for skip mode. The alternative to merge mode is the explicit transmission of motion parameters, where motion vector, corresponding reference picture index for each reference picture list, reference picture list usage flag, and other useful information are signaled explicitly per each CU.

3.6 Deblocking Filter

Deblocking filtering is an example in-loop filter in video codec. In VVC, the deblocking filtering process is applied on CU boundaries, transform subblock boundaries, and prediction subblock boundaries. The prediction subblock boundaries include the prediction unit boundaries introduced by the Subblock based Temporal Motion Vector prediction (SbTMVP) and affine modes. The transform subblock boundaries include the transform unit boundaries introduced by Subblock transform (SBT) and Intra Sub-Partitions (ISP) modes and transforms due to implicit split of large CUs. The processing order of the deblocking filter is defined as horizontal filtering for vertical edges for the entire picture first, followed by vertical filtering for horizontal edges. This specific order enables either multiple horizontal filtering or vertical filtering processes to be applied in parallel threads. Filtering processes can also be implemented on a CTB-by-CTB basis with only a small processing latency.

The vertical edges in a picture are filtered first. Then the horizontal edges in a picture are filtered with samples modified by the vertical edge filtering process as input. The vertical and horizontal edges in the CTBs of each CTU are processed separately on a coding unit basis. The vertical edges of the coding blocks in a coding unit are filtered starting with the edge on the left-hand side of the coding blocks proceeding through the edges towards the right-hand side of the coding blocks in their geometrical order. The horizontal edges of the coding blocks in a coding unit are filtered starting with the edge on the top of the coding blocks proceeding through the edges towards the bottom of the coding blocks in their geometrical order.

3.6.1 Boundary Decision

Figure 8:
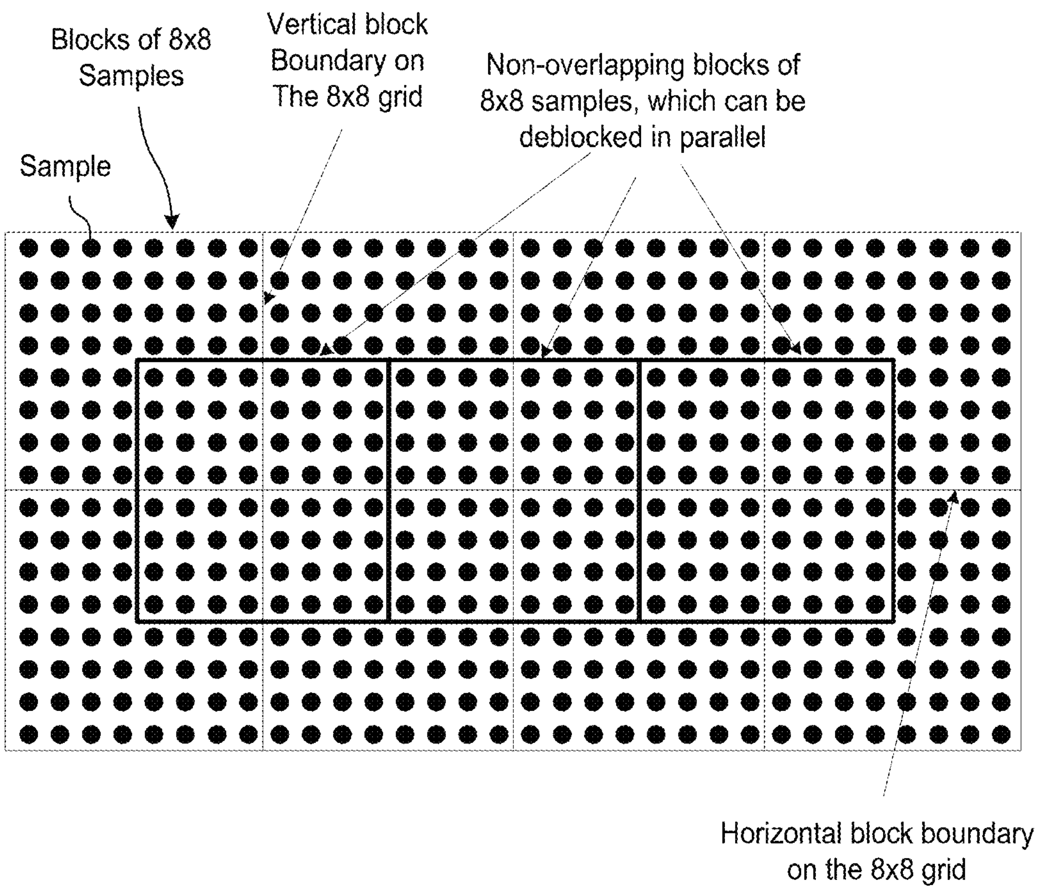
FIG. 8 illustrates an example of block boundaries in a picture.
Figure 9:
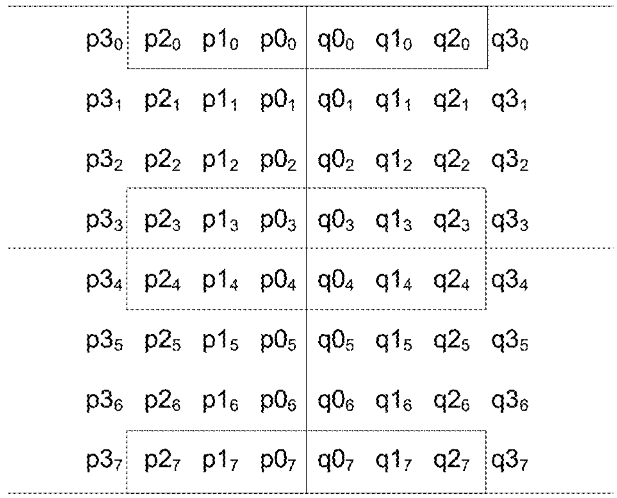
FIG. 9 illustrates an example of pixels involved in filter usage.

Filtering is applied to 8×8 block boundaries. FIG. 8 illustrates picture samples and horizontal and vertical block boundaries on an 8×8 grid. In FIG. 8, the non-overlapping blocks of the 8×8 samples are also shown, which may be deblocked in parallel. In addition, such boundaries must be a transform block boundary or a coding subblock boundary, for example due to usage of Affine motion prediction (ATMVP). For other boundaries, deblocking filtering is disabled.

3.6.2 Boundary Strength Calculation

For a transform block boundary/coding subblock boundary, if the boundary is located in the 8×8 grid, the boundary may be filtered and the setting of bS[xDi][yDj] (wherein [xDi][yDj] denotes the coordinate) for this edge as defined in Table 2 and Table 3, respectively.

| Priority | Conditions | Y | U | V |
|---|---|---|---|---|
| 5 | At least one of the adjacent blocks is intra | 2 | 2 | 2 |
| 4 | TU boundary and at least one of the adjacent blocks has non-zero transform coefficients | 1 | 1 | 1 |
| 3 | Reference pictures or number of MVs (1 for uni-prediction, 2 for bi-prediction) of the adjacent blocks are different | 1 | N/A | N/A |
| 2 | Absolute difference between the motion vectors of same reference picture that belong to the adjacent blocks is greater than or equal to one integer luma sample | 1 | N/A | N/A |
| 1 | Otherwise | 0 | 0 | 0 |

TABLE 2

Boundary strength (when SPS intra block copy (IBC) is disabled)

| Priority | Conditions | Y | U | V |
|---|---|---|---|---|
| 8 | At least one of the adjacent blocks is intra | 2 | 2 | 2 |
| 7 | TU boundary and at least one of the adjacent blocks has non-zero transform coefficients | 1 | 1 | 1 |
| 6 | Prediction mode of adjacent blocks is different (e.g., one is IBC, one is inter) | 1 | | |
| 5 | Both IBC and absolute difference between the motion vectors that belong to the adjacent blocks is greater than or equal to one integer luma sample | 1 | N/A | N/A |
| 4 | Reference pictures or number of MVs (1 for uni-prediction, 2 for bi-prediction) of the adjacent blocks are different | 1 | N/A | N/A |
| 3 | Absolute difference between the motion vectors of same reference picture that belong to the adjacent blocks is greater than or equal to one integer luma sample | 1 | N/A | N/A |
| 1 | Otherwise | 0 | 0 | 0 |

Table 3. Boundary Strength (When SPS IBC is Enabled)

3.6.3 Deblocking Decision for Luma Component

Wider-stronger luma filter is filters are used only if all the Condition1, Condition2 and Condition 3 are TRUE. The condition 1 is the "large block condition". This condition detects whether the samples at P-side and Q-side belong to large blocks, which are represented by the variable bSidePisLargeBlk and bSideQisLargeBlk respectively. The bSidePisLargeBlk and bSideQisLargeBlk are defined as follows.

bSidePisLargeBlk=((edge type is vertical and $p_0$ belongs to CU with width>=32)||(edge type is horizontal and $p_0$ belongs to CU with height>=32))? TRUE: FALSE bSideQisLargeBlk=((edge type is vertical and $q_0$ belongs to CU with width>=32)||(edge type is horizontal and $q_0$ belongs to CU with height>=32))? TRUE: FALSE Based on bSidePisLargeBlk and bSideQisLargeBlk, the condition 1 is defined as follows:

$$\text{Condition1} = (bSidePisLargeBlk \| bSidePisLargeBlk)\,?\,\text{TRUE} : \text{FALSE}$$

Next, if Condition 1 is true, the condition 2 will be further checked. First, the following variables are derived:

dp0, dp3, dq0, dq3 are first derived as in HEVC if (p side is greater than or equal to 32)

$$dp0 = (dp0 + \text{Abs}(p50 - 2 * p40 + p30) + 1) \gg 1$$

$$dp3 = (dp3 + \text{Abs}(p53 - 2 * p43 + p33) + 1) \gg 1$$

if (q side is greater than or equal to 32)

$$dp0 = (dp0 + \text{Abs}(p50 - 2 * p40 + p30) + 1) \gg 1$$

$$dp3 = (dp3 + \text{Abs}(p53 - 2 * p43 + p33) + 1) \gg 1$$

$$\text{Condition2} = (d < \beta)\ ?\ \text{TRUE: FALSE}$$

where $$d = dp0 + dq0 + dp3 + dq3.$$

If Condition1 and Condition2 are valid, whether any of the blocks uses sub-blocks is further checked:

```
If (bSidePisLargeBlk)
 {
  If (mode block P == SUBBLOCKMODE)
    Sp =5
  else
    Sp =7
}
else
 Sp = 3
If (bSideQisLargeBlk)
 {
  If (mode block Q == SUBBLOCKMODE)
    Sq =5
   else
    Sq =7
  }
else
 Sq = 3
```

Finally, if both the Condition 1 and Condition 2 are valid, the proposed deblocking method will check the condition 3 (the large block strong filter condition), which is defined as follows. In the Condition3 StrongFilterCondition, the following variables are derived:

dpq is derived as in HEVC.

$$sp3 = \text{Abs}(p3 - p0), \text{ derived as in } HEVC$$

if (p side is greater than or equal to 32)
  if (Sp==5)

$$sp3 = (sp3 + \text{Abs}(p5 - p3) + 1) \gg 1$$

else $$sp3 = (sp3 + \text{Abs}(p7 - p3) + 1) \gg 1$$

$$sp3 = \text{Abs}(q0 - q3), \text{ derived as in } HEVC$$

if (q side is greater than or equal to 32)
  If (Sq==5)

$$sp3 = (sp3 + \text{Abs}(p5 - p3) + 1) \gg 1$$

else $$sp3 = (sp3 + \text{Abs}(p7 - p3) + 1) \gg 1$$

As in HEVC, StrongFilterCondition=(dpq is less than (β>>2), sp3+sq3 is less than (3*β>>5), and Abs (p0–q0) is less than (5*tC+1)>>1)? TRUE: FALSE.

3.6.4 Stronger Deblocking Filter for Luma

Bilinear filter is used when samples at either one side of a boundary belong to a large block. A sample belonging to a large block is defined as when the width>=32 for a vertical edge, and when height>=32 for a horizontal edge. The bilinear filter is listed below. Block boundary samples pi for i=0 to Sp-1 and qi for j=0 to Sq-1 (pi and qi are the i-th sample within a row for filtering vertical edge, or the i-th sample within a column for filtering horizontal edge) in HEVC deblocking described above) are then replaced by linear interpolation as follows:

$$p_i' = (f_i * \text{Middle}_{s,t} + (64 - f_i) * P_s + 32) \gg 6),$$

clipped to $$p_i \pm tcPD_i$$

$$q_j' = (g_i * \text{Middle}_{s,t} + (64 - g_j) * Q_s + 32) \gg 6),$$

clipped to $$q_i \pm tcPD_j$$

where $tcPD_i$ and $tcPD_i$ term is a position dependent clipping described above and $g_j$, $f_i$, $\text{Middle}_{s,t}$, $P_s$ and $Q_s$ are given below.

3.6.5 Deblocking Decision for Chroma

The chroma strong filters are used on both sides of the block boundary. Here, the chroma filter is selected when both sides of the chroma edge are greater than or equal to 8 (chroma position), and the following decision with three conditions are satisfied: the first one is for decision of boundary strength as well as large block. The proposed filter can be applied when the block width or height which orthogonally crosses the block edge is equal to or larger than 8 in chroma sample domain. The second and third one is basically the same as for HEVC luma deblocking decision, which are on/off decision and strong filter decision, respectively.

In the first decision, boundary strength (bS) is modified for chroma filtering and the conditions are checked sequentially. If a condition is satisfied, then the remaining conditions with lower priorities are skipped. Chroma deblocking is performed when bS is equal to 2, or bS is equal to 1 when a large block boundary is detected. The second and third condition is basically the same as HEVC luma strong filter decision as follows.

In the second condition d is then derived as in HEVC luma deblocking. The second condition will be TRUE when d is less than β. In the third condition StrongFilterCondition is derived as follows:

dpq is derived as in HEVC.

$$sp_3 = \text{Abs}(p_3 - p_0),\ \text{derived as in } HEVC$$

$$sq_3 = \text{Abs}(q_0 - q_3),\ \text{derived as in } HEVC$$

As in HEVC design, StrongFilterCondition=(dpq is less than (β>>2), sp3+sq3 is less than (β>>3), and Abs(p0−q0) is less than (5*tC+1)>>1)

3.6.6 Strong Deblocking Filter for Chroma

The following strong deblocking filter for chroma is defined:

$$p2' = (3*p3 + 2*p2 + p1 + p0 + q0 + 4) \gg 3$$

$$p1' = (2*p3 + p2 + 2*p1 + p0 + q0 + q1 + 4) \gg 3$$

$$p0' = (p3 + p2 + p1 + 2*p0 + q0 + q1 + q2 + 4) \gg 3$$

An example chroma filter performs deblocking on a 4×4 chroma sample grid.

3.6.7 Position Dependent Clipping

The position dependent clipping tcPD is applied to the output samples of the luma filtering process involving strong and long filters that are modifying 7, 5, and 3 samples at the boundary. Assuming quantization error distribution, it is proposed to increase clipping value for samples which are expected to have higher quantization noise, thus expected to have higher deviation of the reconstructed sample value from the true sample value.

For each P or Q boundary filtered with asymmetrical filter, depending on the result of decision-making process, position dependent threshold table is selected from two tables (e.g., Tc7 and Tc3 tabulated below) that are provided to decoder as a side information:

$$Tc7 = \{6, 5, 4, 3, 2, 1, 1\};\ Tc3 = \{6, 4, 2\};$$

$$tcPD = (Sp == 3)\,?\,Tc3:\ Tc7;$$

$$tcQD = (Sq == 3)\,?\,Tc3:\ Tc7;$$

For the P or Q boundaries being filtered with a short symmetrical filter, position dependent threshold of lower magnitude is applied:

$$Tc3 = \{3, 2, 1\};$$

Following defining the threshold, filtered p'i and q'i sample values are clipped according to tcP and tcQ clipping values:

$$p''i = \text{Clip3}(p'i + tcPi,\ p'i - tcPi,\ p'i);$$

$$q''j = \text{Clip3}(q'j + tcQj,\ q'j - tcQj,\ q'j);$$

where p'i and q'i are filtered sample values, p"i and q"j are output sample value after the clipping and tcPi tcPi are clipping thresholds that are derived from the VVC tc parameter and tcPD and tcQD. The function Clip3 is a clipping function as it is specified in VVC.

3.6.7 Sub-Block Deblocking Adjustment

To enable parallel friendly deblocking using both long filters and sub-block deblocking the long filters is restricted to modify at most 5 samples on a side that uses sub-block deblocking (AFFINE or ATMVP or decoder-side motion vector refinement (DMVR)) as shown in the luma control for long filters. Additionally, the sub-block deblocking is adjusted such that that sub-block boundaries on an 8×8 grid that are close to a CU or an implicit TU boundary is restricted to modify at most two samples on each side.

The following applies to sub-block boundaries that not are aligned with the CU boundary.

```
If (mode block Q == SUBBLOCKMODE && edge !=0) {
  if (!(implicitTU && (edge == (64 / 4))))
    if (edge == 2 || edge == (orthogonalLength − 2) || edge == (56 / 4) ||
    edge == (72 / 4))
        Sp = Sq = 2;
      else
        Sp = Sq = 3;
  else
      Sp = Sq = bSideQisLargeBlk ? 5:3
}
```

where edge equal to 0 corresponds to CU boundary, edge equal to 2 or equal to orthogonalLength-2 corresponds to sub-block boundary 8 samples from a CU boundary, etc. Where implicit TU is true if implicit split of TU is used.

3.7 Sample Adaptive Offset

Sample adaptive offset (SAO) is applied to the reconstructed signal after the deblocking filter by using offsets specified for each CTB by the encoder. The video encoder first makes the decision on whether or not the SAO process is to be applied for current slice. If SAO is applied for the slice, each CTB is classified as one of five SAO types as shown in Table 4. The concept of SAO is to classify pixels into categories and reduces the distortion by adding an offset to pixels of each category. SAO operation includes edge offset (EO) which uses edge properties for pixel classification in SAO type 1 to 4 and band offset (BO) which uses pixel intensity for pixel classification in SAO type 5. Each applicable CTB has SAO parameters including sao_merge_left_flag, sao_merge_up_flag, SAO type and four offsets. If sao_merge_left_flag is equal to 1, the current CTB will reuse the SAO type and offsets of the CTB to the left. If sao_merge_up_flag is equal to 1, the current CTB will reuse SAO type and offsets of the CTB above.

TABLE 4

Specification of SAO type

| SAO type | sample adaptive offset type to be used | Number of categories |
|---|---|---|
| 0 | None | 0 |
| 1 | 1-D 0-degree pattern edge offset | 4 |
| 2 | 1-D 90-degree pattern edge offset | 4 |
| 3 | 1-D 135-degree pattern edge offset | 4 |
| 4 | 1-D 45-degree pattern edge offset | 4 |
| 5 | band offset | 4 |

3.7 Adaptive Loop Filter

Adaptive loop filtering for video coding is to minimize the mean square error between original samples and decoded samples by using Wiener-based adaptive filter. The ALF is located at the last processing stage for each picture and can be regarded as a tool to catch and fix artifacts from previous stages. The suitable filter coefficients are determined by the encoder and explicitly signaled to the decoder. To achieve better coding efficiency, especially for high resolution videos, local adaptation is used for luma signals by applying different filters to different regions or blocks in a picture. In addition to filter adaptation, filter on/off control at coding tree unit (CTU) level is also helpful for improving coding efficiency. Syntax-wise, filter coefficients are sent in a picture level header called adaptation parameter set, and filter on/off flags of CTUs are interleaved at CTU level in the slice data. This syntax design not only supports picture level optimization but also achieves a low encoding latency.

3.8.1 Signaling of Parameters

According to ALF design in VTM, filter coefficients and clipping indices are carried in ALF adaptation parameter sets (APSs). An ALF APS can include up to 8 chroma filters and one luma filter set with up to 25 filters. An index is also included for each of the 25 luma classes. Classes having the same index share the same filter. By merging different classes, the num of bits required to represent the filter coefficients is reduced. The absolute value of a filter coefficient is represented using a 0th order Exp-Golomb code followed by a sign bit for a non-zero coefficient. When clipping is enabled, a clipping index is also signaled for each filter coefficient using a two-bit fixed-length code. Up to 8 ALF APSs can be used by the decoder at the same time.

Filter control syntax elements of ALF in VTM include two types of information. First, ALF on/off flags are signaled at sequence, picture, slice and CTB levels. Chroma ALF can be enabled at picture and slice level only if luma ALF is enabled at the corresponding level. Second, filter usage information is signaled at picture, slice and CTB level, if ALF is enabled at that level. Referenced ALF APSs identifiers (IDs) are coded at a slice level or at a picture level if all the slices within the picture use the same APSs. Luma component can reference up to 7 ALF APSs and chroma components can reference 1 ALF APS. For a luma CTB, an index is signalled indicating which ALF APS or offline trained luma filter set is used. For a chroma CTB, the index indicates which filter in the referenced APS is used.

The data syntax elements of ALF associated to LUMA component in VTM are listed as follows:

| | Descriptor |
|---|---|
| alf_data( ) { | |
| alf_luma_filter_signal_flag | u(1) |
| if( alf_luma_filter_signal_flag ) { | |
| alf_luma_clip_flag | u(1) |
| alf_luma_num_filters_signalled_minus1 | ue(v) |
| if( alf_luma_num_filters_signalled_minus1 > 0 ) | |
| for( filtIdx = 0; filtIdx < NumAlfFilters; filtIdx++ ) | |
| alf_luma_coeff_delta_idx[ filtIdx ] | u(v) |
| for( sfIdx = 0; sfIdx <= alf_luma_num_filters_signalled_minus1; sfIdx++ ) | |
| for( j = 0; j < 12; j++ ) { | |
| alf_luma_coeff_abs[ sfIdx ][ j ] | ue(v) |
| if( alf_luma_coeff_abs[ sfIdx ][ j ] ) | |
| alf_luma_coeff_sign[ sfIdx ][ j ] | u(1) |
| } | |
| if( alf_luma_clip_flag ) | |
| for( sfIdx = 0; sfIdx <= alf_luma_num_filters_signalled_minus1; sfIdx++ ) | |
| for( j = 0; j < 12; j++ ) | |
| alf_luma_clip_idx[ sfIdx ][ j ] | u(2) |
| } | |

alf_luma_filter_signal_flag equal to 1 specifies that a luma filter set is signalled. alf_luma_filter_signal_flag equal to 0 specifies that a luma filter set is not signalled. alf_luma_clip_flag equal to 0 specifies that linear adaptive loop filtering is applied to the luma component. alf_luma_clip_flag equal to 1 specifies that non-linear adaptive loop filtering could be applied to the luma component. alf_luma_num_filters_signalled_minus1 plus 1 specifies the number of adaptive loop filter classes for which luma coefficients can be signalled. The value of alf_luma_num_filters_signalled_minus1 shall be in the range of 0 to NumAlfFilters−1, inclusive. alf_luma_coeff_delta_idx[filtIdx] specifies the indices of the signalled adaptive loop filter luma coefficient deltas for the filter class indicated by filtIdx ranging from 0 to NumAlfFilters−1. When alf_luma_coeff_delta_idx[filtIdx] is not present, it is inferred to be equal to 0. The length of alf_luma_coeff_delta_idx[filtIdx] is Ceil(Log2(alf_luma_num_filters_signalled_minus1+1)) bits. The value of alf_luma_coeff_delta_idx[filtIdx] shall be in the range of 0 to alf_luma_num_filters_signalled_minus1, inclusive.

alf_luma_coeff_abs[sfIdx][j] specifies the absolute value of the j-th coefficient of the signalled luma filter indicated by sfIdx. When alf_luma_coeff_abs[sfIdx][j] is not present, it is inferred to be equal 0. The value of alf_luma_coeff_abs[sfIdx][j] shall be in the range of 0 to 128, inclusive. alf_luma_coeff_sign[sfIdx][j] specifies the sign of the j-th luma coefficient of the filter indicated by sfIdx as follows:

If alf_luma_coeff_sign[sfIdx][j] is equal to 0, the corresponding luma filter coefficient has a positive value.

Otherwise (alf_luma_coeff_sign[sfIdx][j] is equal to 1), the corresponding luma filter coefficient has a negative value.

When alf_luma_coeff_sign[sfIdx][j] is not present, it is inferred to be equal to 0.

alf_luma_clip_idx[sfIdx][j] specifies the clipping index of the clipping value to use before multiplying by the j-th coefficient of the signalled luma filter indicated by sfIdx. When alf_luma_clip_idx[sfIdx][j] is not present, it is inferred to be equal to 0. The coding tree unit syntax elements of ALF associated to LUMA component in VTM are listed as follows:

| | Descriptor |
|---|---|
| coding_tree_unit( ) { | |
| xCtb = CtbAddrX << CtbLog2SizeY | |
| yCtb = CtbAddrY << CtbLog2SizeY | |
| if( sh_alf_enabled_flag ){ | |
| alf_ctb_flag[ 0 ][ CtbAddrX ][ CtbAddrY ] | ae(v) |
| if( alf_ctb_flag[ 0 ][ CtbAddrX ][ CtbAddrY ] ) { | |
| if( sh_num_alf_aps_ids_luma > 0 ) | |
| alf_use_aps_flag | ae(v) |
| if( alf_use_aps_flag ) { | |
| if( sh_num_alf_aps_ids_luma > 1 ) | |
| alf_luma_prev_filter_idx | ae(v) |
| } else | |
| alf_luma_fixed_filter_idx | ae(v) |
| } | |
| } | |

alf_ctb_flag[cIdx][xCtb>>CtbLog2SizeY][yCtb>>CtbLog2SizeY] equal to 1 specifies that the adaptive loop filter is applied to the coding tree block of the colour component indicated by cIdx of the coding tree unit it at luma location (xCtb, yCtb). alf_ctb_flag[cIdx][xCtb>>CtbLog2SizeY][yCtb>>CtbLog2SizeY] equal to 0 specifies that the adaptive loop filter is not applied to the coding tree block of the colour component indicated by cIdx of the coding tree unit at luma location (xCtb, yCtb).

When alf_ctb_flag[cIdx][xCtb>>CtbLog2SizeY][yCtb>>CtbLog2SizeY] is not present, it is inferred to be equal to 0. alf_use_aps_flag equal to 0 specifies that one of the fixed filter sets is applied to the luma CTB. alf_use_aps_flag equal to 1 specifies that a filter set from an APS is applied to the luma CTB. When alf_use_aps_flag is not present, it is inferred to be equal to 0. alf_luma_prev_filter_idx specifies the previous filter that is applied to the luma CTB. The value of alf_luma_prev_filter_idx shall be in a range of 0 to sh_num_alf_aps_ids_luma−1, inclusive. When alf_luma_prev_filter_idx is not present, it is inferred to be equal to 0.

The variable AlfCtbFiltSetIdxY[xCtb>>CtbLog2SizeY][yCtb>>CtbLog2SizeY] specifying the filter set index for the luma CTB at location (xCtb, yCtb) is derived as follows:

If alf_use_aps_flag is equal to 0, AlfCtbFiltSetIdxY[xCtb>>CtbLog2SizeY][yCtb>>CtbLog2SizeY] is set equal to alf_luma_fixed_filter_idx.

Otherwise, AlfCtbFiltSetIdxY[xCtb>>CtbLog2SizeY][yCtb>>CtbLog2SizeY] is set equal to 16+alf_luma_prev_filter_idx.

alf_luma_fixed_filter_idx specifies the fixed filter that is applied to the luma CTB. The value of alf_luma_fixed_filter_idx shall be in a range of 0 to 15, inclusive.

Based on the ALF design of VTM, the ALF design of ECM further introduces the concept of alternative filter sets into luma filters. The luma filters are be trained multiple alternatives/rounds based on the updated luma CTU ALF on/off decisions of each alternative/rounds. In such way, there will be multiple filter sets that associated to each training alternative and the class merging results of each filter set may be different. Each CTU could select the best filter set by RDO and the related alternative information will be signaled. The data syntax elements of ALF associated to LUMA component in ECM are listed as follows:

| | Descriptor |
|---|---|
| alf_data( ) { | |
| alf_luma_filter_signal_flag | u(1) |
| if( alf_luma_filter_signal_flag ) { | |
| alf_luma_num_alts_minus1 | ue(v) |
| for(altIdx = 0; altIdx < alf_luma_num_alts_minus1 +1; altIdx++){ | |
| alf_luma_clip_flag[altIdx] | u(1) |
| alf_luma_num_filters_signalled_minus1[altIdx] | ue(v) |
| if(alf_luma_num_filters_signalled_minus1[altIdx] > 0){ | |
| for( filtIdx = 0; filtIdx < NumAlfFilters; filtIdx++ ) | |
| alf_luma_coeff_delta_idx[altIdx][filtIdx] | u(v) |
| } | |
| for(sfIdx = 0; sfIdx <= alf_luma_num_filters_signalled_minus1[altIdx]; sfIdx++){ | |
| for(j = 0; j < 19; j++){ | |
| alf_luma_coeff_abs[altIdx][ sfIdx ][ j ] | ue(v) |
| if( alf_luma_coeff_abs[altIdx][ sfIdx ][ j ] ) | |
| alf_luma_coeff_sign[altIdx][ sfIdx ][ j ] | u(1) |
| } | |
| } | |
| if( alf_luma_clip_flag [altIdx]) | |
| for( sfIdx = 0; sfIdx <= alf_luma_num_filters_signalled_minus1[altIdx]; sfIdx++ ) | |
| for( j = 0; j <19; j++ ) | |
| alf_luma_clip_idx[altIdx][ sfIdx ][ j ] | u(2) |
| } | |
| } | |

alf_luma_num_alts_minus1 plus 1 specifies the number of alternative filter sets for luma component. The value of alf_luma_num_alts_minus1 shall be in the range of 0 to 3, inclusive. alf_luma_clip_flag[altIdx] equal to 0 specifies that linear adaptive loop filtering is applied to the alternative luma filter set with index altIdxluma component. alf_luma_clip_flag[altIdx] equal to 1 specifies that non-linear adaptive loop filtering could be applied to the alternative luma filter set with index altIdx luma component. alf_luma_num_filters_signalled_minus1[altIdx] plus 1 specifies the number of adpative loop filter classes for which luma coefficients can be signalled of the alternative luma filter set with index altIdx. The value of alf_luma_num_filters_signalled_minus1[altIdx] shall be in the range of 0 to NumAlfFilters−1, inclusive.

alf_luma_coeff_delta_idx[altIdx][filtIdx] specifies the indices of the signalled adaptive loop filter luma coefficient deltas for the filter class indicated by filtIdx ranging from 0 to NumAlfFilters−1 for the alternative luma filter set with index altIdx. When alf_luma_coeff_delta_idx[filtIdx][altIdx] is not present, it is inferred to be equal to 0. The length of alf_luma_coeff_delta_idx[altIdx][filtIdx] is Ceil(Log2(alf_luma_num_filters_signalled_minus1[altIdx]+1)) bits. The value of alf_luma_coeff_delta_idx[altIdx][filtIdx] shall be in the range of 0 to alf_luma_num_filters_signalled_minus1 [altIdx], inclusive. alf_luma_coeff_abs[altIdx][sfIdx][j] specifies the absolute value of the j-th coefficient of the signalled luma filter indicated by sfIdx of the alternative luma filter set with index altIdx. When alf_luma_coeff_abs[altIdx][sfIdx][j] is not present, it is inferred to be equal 0. The value of alf_luma_coeff_abs[altIdx][sfIdx][j] shall be in the range of 0 to 128, inclusive.

alf_luma_coeff_sign[altIdx][sfIdx][j] specifies the sign of the j-th luma coefficient of the filter indicated by sfIdx of the alternative luma filter set with index altIdx as follows:

If alf_luma_coeff_sign[altIdx][sfIdx][j] is equal to 0, the corresponding luma filter coefficient has a positive value.

Otherwise (alf_luma_coeff_sign[altIdx][sfIdx][j] is equal to 1), the corresponding luma filter coefficient has a negative value.

When alf_luma_coeff_sign[altIdx][sfIdx][j] is not present, it is inferred to be equal to 0.

alf_luma_clip_idx[altIdx][sfIdx][j] specifies the clipping index of the clipping value to use before multiplying by the j-th coefficient of the signalled luma filter indicated by sfIdx of the alternative luma filter set with index altIdx. When alf_luma_clip_idx[altIdx][sfIdx][j] is not present, it is inferred to be equal to 0. The coding tree unit syntax elements of ALF associated to LUMA component in ECM are listed as follows:

| | Descriptor |
|---|---|
| coding_tree_unit( ) { | |
| xCtb = CtbAddrX << CtbLog2SizeY | |
| yCtb = CtbAddrY << CtbLog2SizeY | |
| if( sh_alf_enabled_flag ){ | |
| alf_ctb_flag[ 0 ][ CtbAddrX ][ CtbAddrY ] | ae(v) |
| if( alf_ctb_flag[ 0 ][ CtbAddrX ][ CtbAddrY ] ) { | |
| if( sh_num_alf_aps_ids_luma > 0 ) | |
| alf_use_aps_flag | ae(v) |
| if( alf_use_aps_flag ) { | |
| if( sh_num_alf_aps_ids_luma > 1 ) | |
| alt_ctb_luma_filter_alt_idx[CtbAddrX][CtbAddrY] | ae(v) |
| alf_luma_prev_filter_idx | ae(v) |
| } else | |
| alf_luma_fixed_filter_idx | ae(v) |
| } | |
| } | |

alf_ctb_luma_filter_alt_idx[xCtb>>CtbLog2SizeY][yCtb>>CtbLog2SizeY] specifies the index of the alternative luma filters applied to the coding tree block of the luma component, of the coding tree unit at luma location (xCtb, yCtb). When alf_ctb_luma_filter_alt_idx[xCtb>>CtbLog2SizeY][yCtb>>CtbLog2SizeY] is not present, it is inferred to be equal to zero.

3.8.2 Filter Shapes

Figure 10:
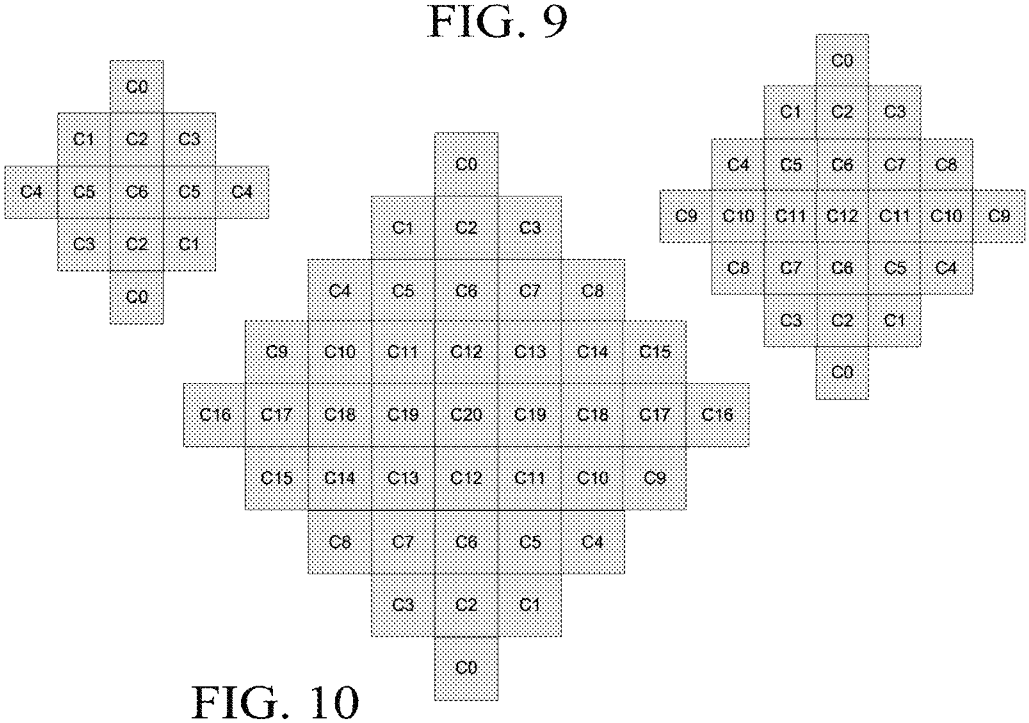
FIG. 10 illustrates an example of filter shapes for adaptive loop filter (ALF).

In the JEM, up to three diamond filter shapes (as shown in FIG. 10) can be selected for the luma component. An index is signalled at the picture level to indicate the filter shape used for the luma component. Each square represents a sample, and Ci (i being 0~6 (left), 0~12 (right), 0~20 (middle)) denotes the coefficient to be applied to the sample. For chroma components in a picture, the 5×5 diamond shape is always used. In VVC, the 7×7 diamond shape is always used for Luma while the 5×5 diamond shape is always used for Chroma.

3.8.3 Classification for ALF

Each 2×2 (or 4×4) block is categorized into one out of 25 classes. The classification index C is derived based on its directionality D and a quantized value of activity Â, as follows:

$$C = 5D + \hat{A}.$$

To calculate D and Â, gradients of the horizontal, vertical and two diagonal direction are first calculated using 1-D Laplacian:

$$g_v = \sum_{k=i-2}^{i+3} \sum_{l=j-2}^{j+3} V_{k,l},\ V_{k,l} = |2R(k,l) - R(k,l-1) - R(k,l+1)|,$$

$$g_h = \sum_{k=i-2}^{i+3} \sum_{l=j-2}^{j+3} H_{k,l},\ H_{k,l} = |2R(k,l) - R(k-1,l) - R(k+1,l)|,$$

$$g_{d1} = \sum_{k=i-2}^{i+3} \sum_{l=j-3}^{j+3} D1_{k,l},\ D1_{k,l} = |2R(k,l) - R(k-1,l-1) - R(k+1,l+1)|$$

$$g_{d2} = \sum_{k=i-2}^{i+3} \sum_{j=j-2}^{j+3} D2_{k,l},\ D2_{k,l} = |2R(k,l) - R(k-1,l+1) - R(k+1,l-1)|$$

Indices i and j refer to the coordinates of the upper left sample in the 2×2 block and R(i, j) indicates a reconstructed sample at coordinate (i, j). Then D maximum and minimum values of the gradients of horizontal and vertical directions are set as:

$$g_{h,v}^{max} = \max(g_h, g_v),\ g_{h,v}^{min} = \min(g_h, g_v),$$

and the maximum and minimum values of the gradient of two diagonal directions are set as:

$$g_{d0,d1}^{max} = \max(g_{d0}, g_{d1}),\ g_{d0,d1}^{min} = \min(g_{d0}, g_{d1}),$$

To derive the value of the directionality D, these values are compared against each other and with two thresholds $t_1$ and $t_2$:

Step 1. If both $$g_{h,v}^{max} \le t_1 \cdot g_{h,v}^{min} \text{ and } g_{d0,d1}^{max} \le t_1 \cdot g_{d0,d1}^{min}$$

are true, D is set to 0.

Step 2. If $$g_{h,v}^{max} / g_{h,v}^{min} > g_{d0,d1}^{max} / g_{d0,d1}^{min},$$

continue from Step 3; otherwise continue from Step 4.

Step 3. If $$g_{h,v}^{max} > t_2 \cdot g_{h,v}^{min},$$

D is set to 2; otherwise D is set to 1.

Step 4. If $$g_{d0,d1}^{max} > t_2 \cdot g_{d0,d1}^{min},$$

D is set to 4; otherwise D is set to 3.

The activity value A is calculated as:

$$A=\sum_{k=i-2}^{i+3}\sum_{l=j-2}^{j+3}(V_{k,l}+H_{k,l}).$$

A is further quantized to the range of 0 to 4, inclusively, and the quantized value is denoted as Â. For both chroma components in a picture, no classification method is applied, i.e., a single set of ALF coefficients is applied for each chroma component.

3.8.3 Geometric Transformations of Filter Coefficients

Before filtering each 2×2 block, geometric transformations such as rotation or diagonal and vertical flipping are applied to the filter coefficients f (k, l), which is associated with the coordinate (k, l), depending on gradient values calculated for that block. This is equivalent to applying these transformations to the samples in the filter support region. The idea is to make different blocks to which ALF is applied more similar by aligning their directionality.

Figure 11:
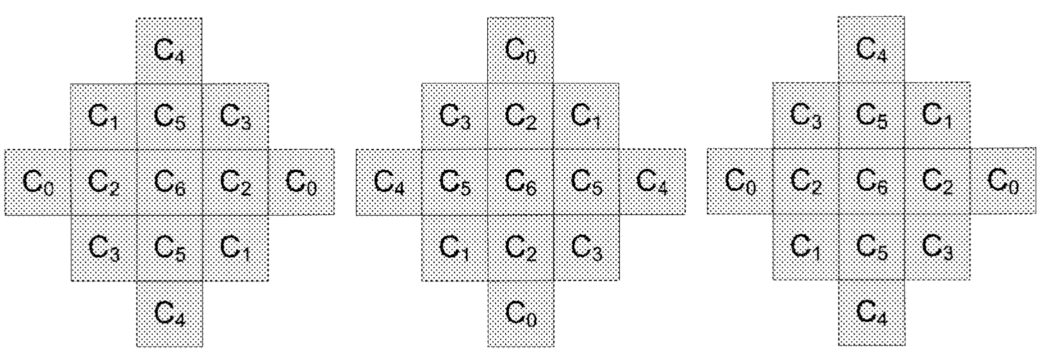
FIG. 11 illustrates an example of transformed coefficients for 5×5 diamond filter support.

Three geometric transformations, including diagonal, vertical flip and rotation are introduced:

$$\text{Diagonal: } f_D(k,l)=f(l,k),$$

$$\text{Vertical flip: } f_V(k,l)=f(k,K-l-1),$$

$$\text{Rotation: } f_R(k,l)=f(K-l-1,k).$$

where K is the size of the filter and 0≤k, l≤K−1 are coefficients coordinates, such that location (0,0) is at the upper left corner and location (K−1, K−1) is at the lower right corner. The transformations are applied to the filter coefficients f(k, l) depending on gradient values calculated for that block. The relationship between the transformation and the four gradients of the four directions are summarized in Table 5. FIG. 11 shows the transformed coefficients for each position based on the 5×5 diamond.

TABLE 5

Mapping of the gradient calculated for one block and the transformations.

| Gradient values | Transformation |
|---|---|
| $g_{d2} < g_{d1}$ and $g_h < g_v$ | No transformation |
| $g_{d2} < g_{d1}$ and $g_v < g_h$ | Diagonal |
| $g_{d1} < g_{d2}$ and $g_h < g_v$ | Vertical flip |
| $g_{d1} < g_{d2}$ and $g_v < g_h$ | Rotation |

3.8.3 Filtering Process

At decoder side, when ALF is enabled for a block, each sample R(i, j) within the block is filtered, resulting in sample value R'(i, j) as shown below, where L denotes filter length, $f_{m,n}$ represents filter coefficient, and f(k, l) denotes the decoded filter coefficients.

$$R'(i,j)=\sum_{k=-L/2}^{L/2}\sum_{l=-L/2}^{L/2}f(k,l)\times R(i+k,j+l)$$

Figure 12:
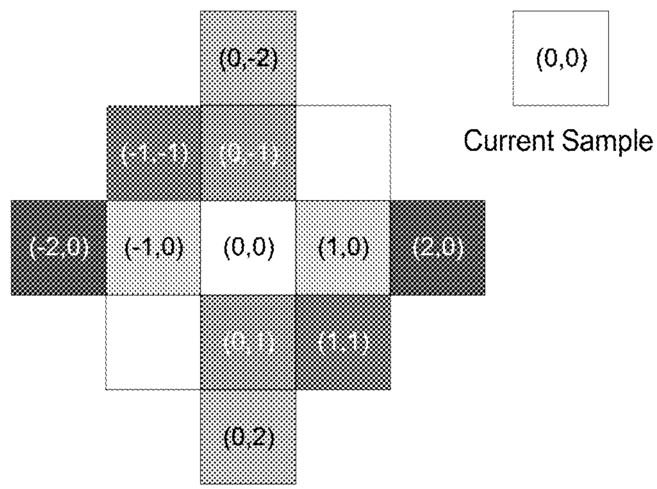
FIG. 12 illustrates an example of relative coordinates for 5×5 diamond filter support.

FIG. 12 shows an example of relative coordinates used for 5×5 diamond filter support supposing the current sample's coordinate (i, j) to be (0, 0). Samples in different coordinates filled with the same color are multiplied with the same filter coefficients.

3.8.3 Non-Linear Filtering Reformulation

Linear filtering can be reformulated, without coding efficiency impact, in the following expression:

$$O(x,y)=I(x,y)+\sum_{(i,j)\neq(0,0)}w(i,j)\cdot(I(x+i,y+j)-I(x,y))$$

where w(i, j) are the same filter coefficients.

VVC introduces the non-linearity to make ALF more efficient by using a simple clipping function to reduce the impact of neighbor sample values (I(x+i, y+j)) when they are too different with the current sample value (I(x, y)) being filtered. More specifically, the ALF filter is modified as follows:

$$O'(x,y)=I(x,y)+\sum_{(i,j)\neq(0,0)}w(i,j)\cdot K(I(x+i,y+j)-I(x,y),k(i,j))$$

where K(d, b)=min (b, max(−b,d)) is the clipping function, and k i, j) are clipping parameters, which depends on the (i, j) filter coefficient. The encoder performs the optimization to find the best k(i, j).

The clipping parameters k(i, j) are specified for each ALF filter, one clipping value is signaled per filter coefficient. It means that up to 12 clipping values can be signaled in the bitstream per Luma filter and up to 6 clipping values for the Chroma filter. In order to limit the signaling cost and the encoder complexity, only 4 fixed values which are the same for INTER and INTRA slices are used.

Because the variance of the local differences is often higher for Luma than for Chroma, two different sets for the Luma and Chroma filters are applied. The maximum sample value (here 1024 for 10 bits bit-depth) in each set is also introduced, so that clipping can be disabled if it is not necessary. The 4 values have been selected by roughly equally splitting, in the logarithmic domain, the full range of the sample values (coded on 10 bits) for Luma, and the range from 4 to 1024 for Chroma. More precisely, the Luma table of clipping values have been obtained by the following formula:

$$AlfClip_L=\left\{\text{round}\left(\left((M)^{\frac{1}{N}}\right)^{N-n+1}\right)\text{ for } n\in 1\ \ldots\ N\right]\Big\},\ M=2^{10}\text{ and } N=4$$

Similarly, the Chroma tables of clipping values is obtained according to the following formula:

$$AlfClip_C=\left\{\text{round}\left(A\cdot\left(\left(\frac{M}{A}\right)^{\frac{1}{N-1}}\right)^{N-n}\right)\text{ for } n\in 1\ \ldots\ N\right]\Big\},$$

with $$M=2^{10},\ N=4\text{ and } A=4$$

3.9 Bilateral In-Loop Filter

3.9.1 Bilateral Image Filter

Bilateral image filter is a nonlinear filter that smooths the noise while preserving edge structures. The bilateral filtering is a technique to make the filter weights decrease not only with the distance between the samples but also with increasing difference in intensity. This way, over-smoothing of edges can be ameliorated. A weight is defined as:

$$w(\Delta x, \Delta y, \Delta I) = e^{-\frac{\Delta x^2+\Delta y^2}{2\sigma_d^2}-\frac{\Delta I^2}{2\sigma_r^2}}$$

where Δx and Δy is the distance in the vertical and horizontal and ΔI is the difference in intensity between the samples.

The edge-preserving de-noising bilateral filter adopts a low-pass Gaussian filter for both the domain filter and the range filter. The domain low-pass Gaussian filter gives higher weight to pixels that are spatially close to the center pixel. The range low-pass Gaussian filter gives higher weight to pixels that are similar to the center pixel. Combining the range filter and the domain filter, a bilateral filter at an edge pixel becomes an elongated Gaussian filter that is oriented along the edge and is greatly reduced in gradient direction. This is the reason why the bilateral filter can smooth the noise while preserving edge structures.

3.9.2 Bilateral Filter in Video Coding

The bilateral filter in video coding is a coding tool for the VVC. The filter acts as a loop filter in parallel with the sample adaptive offset (SAO) filter. Both the bilateral filter and SAO act on the same input samples, each filter produces an offset, and these offsets are then added to the input sample to produce an output sample that, after clipping, goes to the next stage. The spatial filtering strength $\sigma_d$ is determined by the block size, with smaller blocks filtered more strongly, and the intensity filtering strength $\sigma_r$ is determined by the quantization parameter, with stronger filtering being used for higher QPs. Only the four closest samples are used, so the filtered sample intensity $I_F$ can be calculated as $$I_F = I_C + \frac{w_A \Delta I_A + w_B \Delta I_B + w_L \Delta I_L + w_R \Delta I_R}{w_C + w_A + w_B + w_L + w_R}$$

where $I_C$ denotes the intensity of the center sample, $\Delta I_A = I_A - I_C$ the intensity difference between the center sample and the sample above. $\Delta I_B$, $\Delta I_L$ and $\Delta I_R$ denote the intensity difference between the center sample and that of the sample below, to the left and to the right respectively.

4. Technical Problems Solved by Disclosed Technical Solutions

Example designs for adaptive loop filter in video coding systems have the following problems. First, in some example ALF designs, only the spatial reconstruction samples before ALF processing are used for filter training and filtering. However, other valuable information can be utilized, such as samples before DBF, SAO or other stages. Second, in some example ALF designs a single filter shape is used for online-trained filters or offline-trained filters. The performance of ALF may be further improved by using a filter shape switch, and/or by employing an extended tap and a spatial tap.

5. a Listing of Solutions and Embodiments

To solve the above-described problems, methods as summarized below are disclosed. The embodiments should be considered as examples to explain the general concepts and should not be interpreted in a narrow way. Furthermore, these embodiments can be applied individually or combined in any manner. It should be noted that the disclosed methods may be used as in-loop filters or post-processing. In this disclosure, a video unit may refer to a sequence, a picture, a sub-picture, a slice, a CTU, a block, and/or a region. The video unit may comprise one color component or multiple color components. In this disclosure, an ALF processing unit may refer to a sequence, a picture, a sub-picture, a slice, a CTU, a block, a region, or a sample. The ALF processing unit may comprise one color component or multiple color components.

Example 1

In an example, at least one extended tap may be used for ALF to further enhance the efficiency of ALF.

Example 2

In one example, at least one extended tap may be different from the spatial tap in ALF, which only utilize the information of the spatial neighbor samples of the filtering component (e.g., only use spatial neighbor luma samples to filter the central luma sample inside one filter). In one example, at least one extended tap and at least one spatial tap may co-exist inside one ALF filter. In one example, an ALF filter may include of both spatial and extended tap. In one example, an ALF filter may include M (e.g., M>0) spatial tap/taps and N (e.g., N>0) extended tap/taps. Alternatively, an ALF filter may include only one or more spatial taps. Alternatively, an ALF filter may include only one or more extended taps.

Example 3

In one example, a filter with at least one extended tap may be applied to filter different color components. In one example, a filter with at least one extended tap may only be applied to filter Luma components. Alternatively, a filter with at least one extended tap may be only applied to filter one of the Chroma components (e.g., Cb or Cr component). Alternatively, a filter with at least one extended tap may be applied to filter both Chroma components. (e.g., Cb and Cr component). Alternatively, a filter with at least one extended tap may be applied to filter all Luma and Chroma components.

Example 4

In one example, the coefficient of an extended tap may be corresponded to one or more inputs. In one example, the coefficient of an extended tap may be only corresponded to one input. Alternatively, the coefficient of an extended tap may be corresponded to N inputs (e.g., N=2).

Example 5

In one example, a filter with at least one extended tap may be trained in different ways. In one example, the training data collection for one or more extended taps of a filter may be performed jointly with one or more spatial taps of a filter. Alternatively, the training data collection for one or more extended taps of a filter may be performed independently. In one example, the coefficients of one or more extended taps of a filter may be trained jointly with one or more spatial taps of a filter. Alternatively, the coefficients of one or more extended taps of a filter may be trained independently. In one example, the parameter (e.g., non-linear clipping parameter) of one or more extended taps of a filter may be derived jointly with one or more spatial taps of a filter. Alternatively, the parameter (e.g., non-linear clipping parameter) of one or more extended taps of a filter may be derived independently.

Example 6

Figure 13:
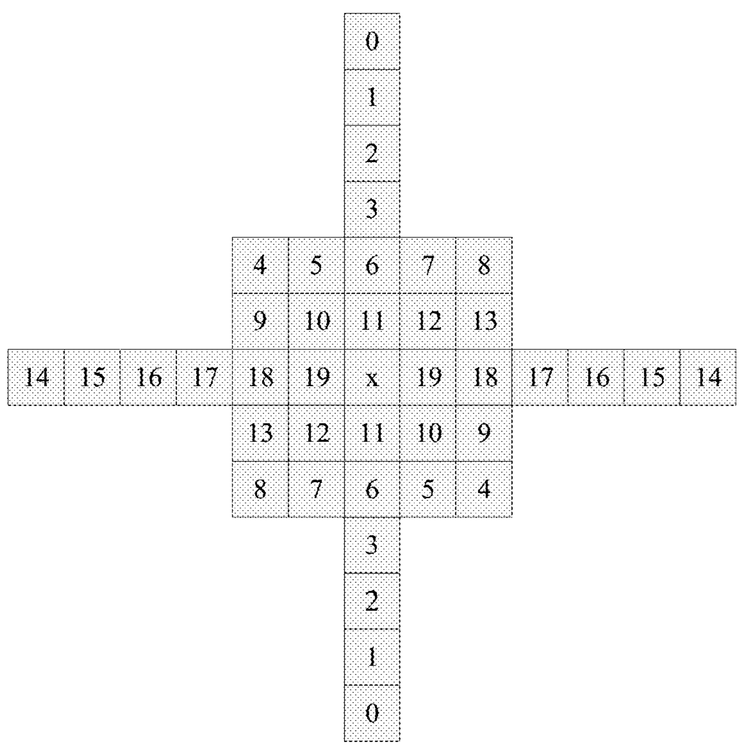
FIG. 13 illustrates an example filter shape used for one or more spatial taps inside a filter with at least one extended tap.

In one example, a filter with at least one extended tap may use different shapes or sizes. In one example, a filter may contain one or more shapes that correspond to different types of taps (e.g., shape used for one or more spatial taps and shape used for one or more extended taps). In one example, inside a filter, the shape used for one or more spatial taps may be different from the shape used for one or more extended taps. Alternatively, inside a filter, the shape used for one or more spatial taps may be identical to the shape used for one or more extended taps. In one example, inside a filter, the filter shape used for one or more spatial taps may use different shapes. In one example, the filter shape used for one or more spatial taps may use a diamond shape. In one example, the filter shape used for one or more spatial taps may use a square shape. In one example, the filter shape used for one or more spatial taps may use a cross shape. Alternatively, the filter shape used for one or more spatial taps may use a symmetrical shape. Alternatively, the filter shape used for one or more spatial taps may use an asymmetrical shape. Alternatively, the filter shape used for one or more spatial taps may use any other shapes. In one example, the filter shape used for one or more spatial tap may be designed as FIG. 13. In one example, the filter shape used for one or more spatial taps may be determined on the fly, signaled, or derived.

Example 7

In one example, inside a filter, the filter shape used for one or more extended taps may use different shapes. In one example, the filter shape used for one or more extended taps may use a diamond shape. In one example, the filter shape used for one or more extended taps may use a square shape. In one example, the filter shape used for one or more extended taps may use a cross shape. Alternatively, the filter shape used for one or more extended taps may use a symmetrical shape. Alternatively, the filter shape used for one or more extended taps may use an asymmetrical shape. Alternatively, the filter shape used for one or more extended taps may use any other shapes. In one example, the filter shape used for one or more extended taps may be determined on the fly, signaled, or derived.

Example 8

In one example, a filter may contain one or more filter lengths that correspond to different types of taps (e.g., filter length used for one or more spatial taps and filter length used for one or more extended taps). In one example, inside a filter, the filter length used for one or more spatial taps may be different from the filter length used for one or more extended taps. Alternatively, inside a filter, the filter length used for one or more spatial taps may be identical to the filter length used for one or more extended taps. In one example, inside a filter, the filter length used for one or more spatial taps may use different sizes. In one example, the filter length used for one or more spatial taps may be equal to N (e.g., N=9 or 11 or 13). In one example, the filter length used for one or more spatial taps may be determined on the fly, signaled, or derived. In one example, inside a filter, the filter length used for one or more extended taps may use different sizes. In one example, the filter length used for one or more extended taps may be equal to N (e.g., N=3). In one example, the filter length used for one or more extended taps may be determined on the fly, signaled, or derived. In one example, a filter which contains one or more spatial taps and one or more extended taps may designed as follows.

Example 9

Figure 14:
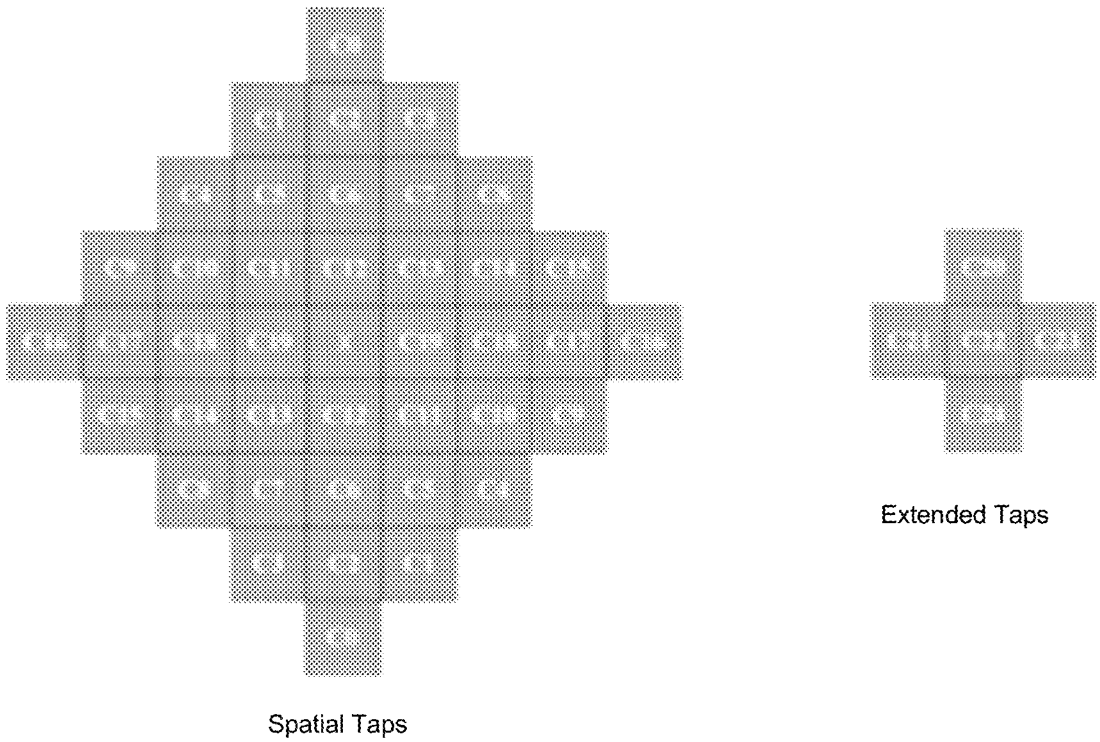
FIG. 14 illustrates an example filter that contains both spatial and extended taps.

In one example, a filter contains 20 spatial taps with a diamond shape and 5 extended taps with a diamond shape may be designed as in FIG. 14.

Example 10

Figure 15:
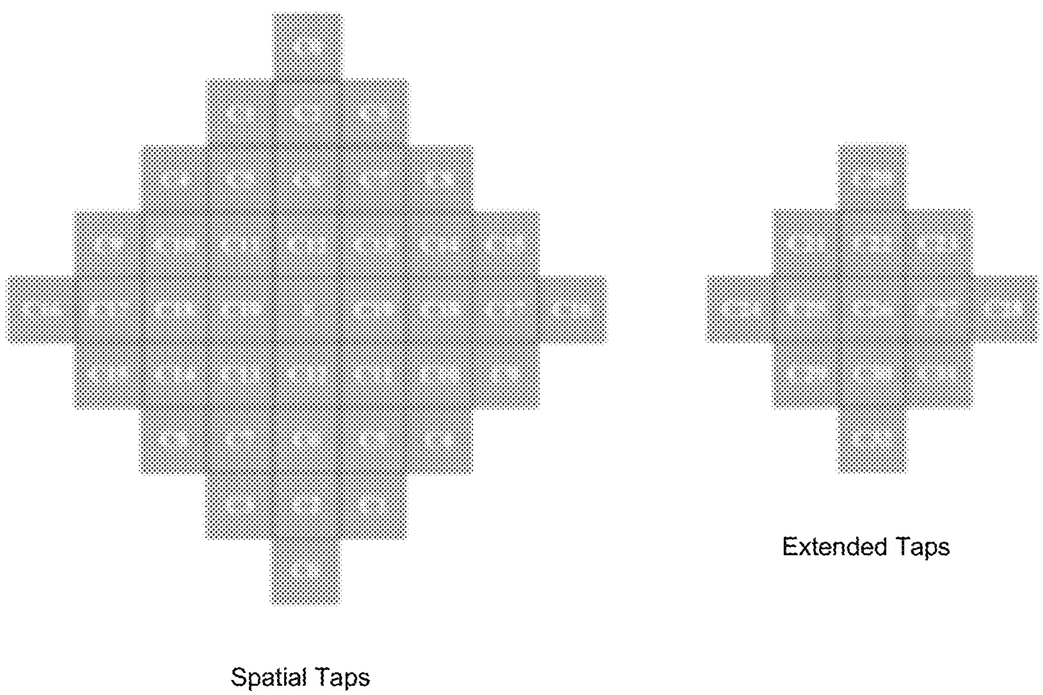
FIG. 15 illustrates an example filter that contains both spatial and extended taps.

In one example, a filter contains 20 spatial taps with a diamond shape and 13 extended taps with a diamond shape may be designed as in FIG. 15.

Example 11

Figure 16:
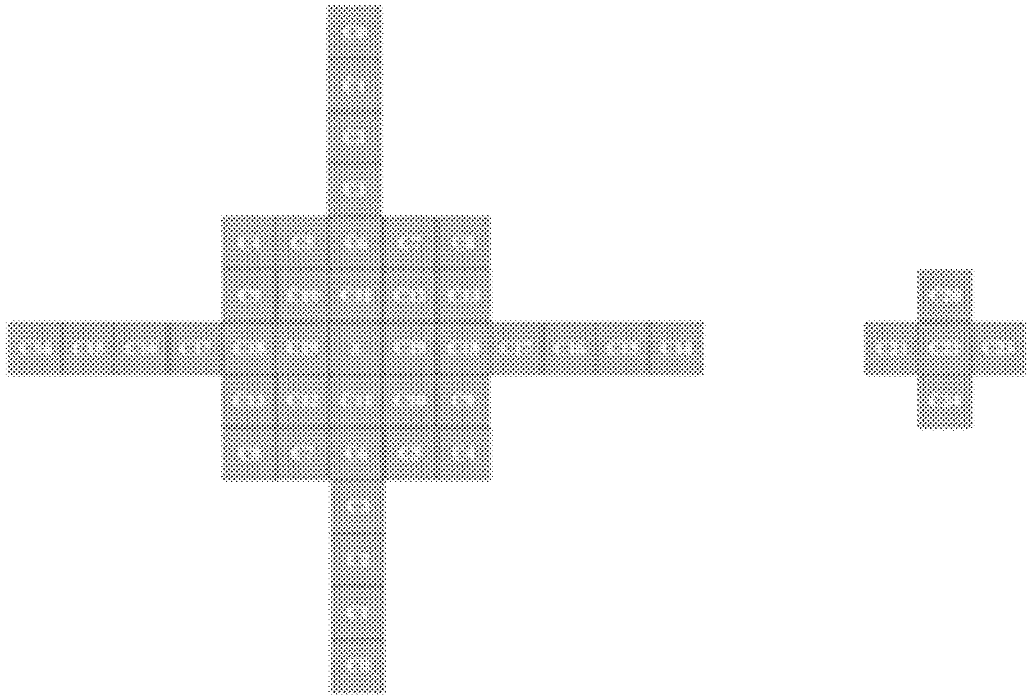
FIG. 16 illustrates an example filter that contains both spatial and extended taps.

In one example, a filter contains 20 spatial taps with a cross shape and 5 extended taps with a diamond shape may be designed as in FIG. 16.

Example 12

Figure 17:
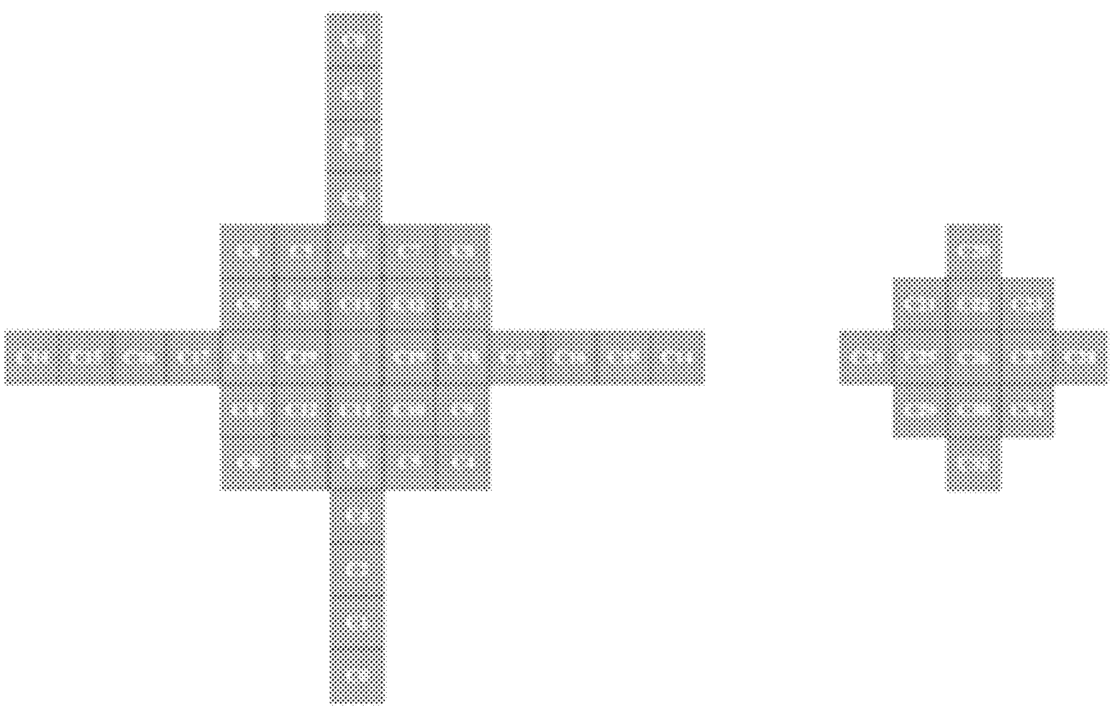
FIG. 17 illustrates an example filter that contains both spatial and extended taps.

In one example, a filter contains 20 spatial taps with a cross shape and 13 extended taps with a diamond shape may be designed as in FIG. 17.

Example 13

Figure 18:
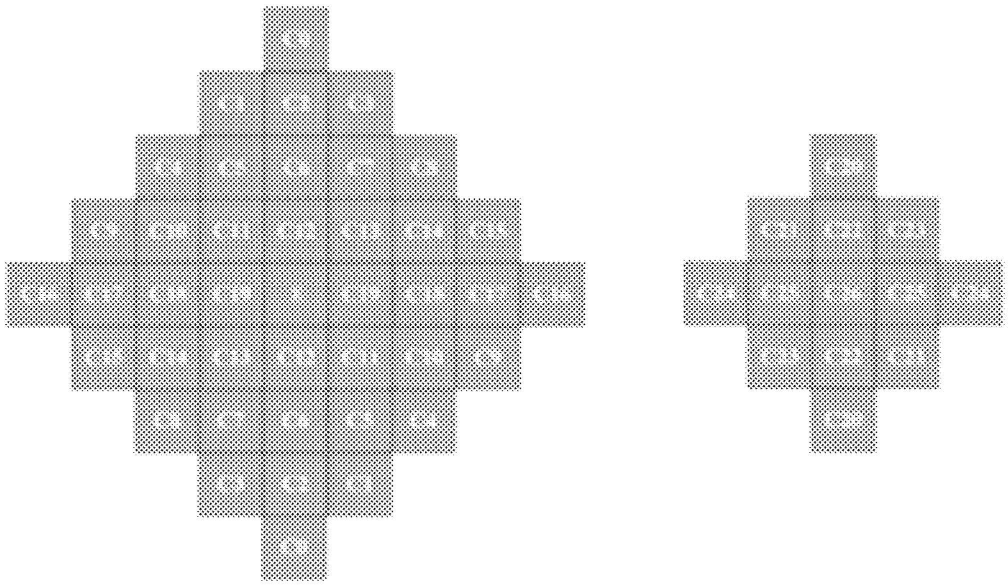
FIG. 18 illustrates an example filter that contains both spatial and extended taps.

In one example, the symmetrical constrain may be performed on the filter which contains at least one extended tap. In one example, the geometric symmetrical constrain may be performed on one or more spatial taps. In one example, the geometric symmetrical constrain may be performed on one or more extended taps. In one example, a filter that contains 20 spatial taps and 7 extended taps may be designed as FIG. 18.

Example 14

Figure 19:
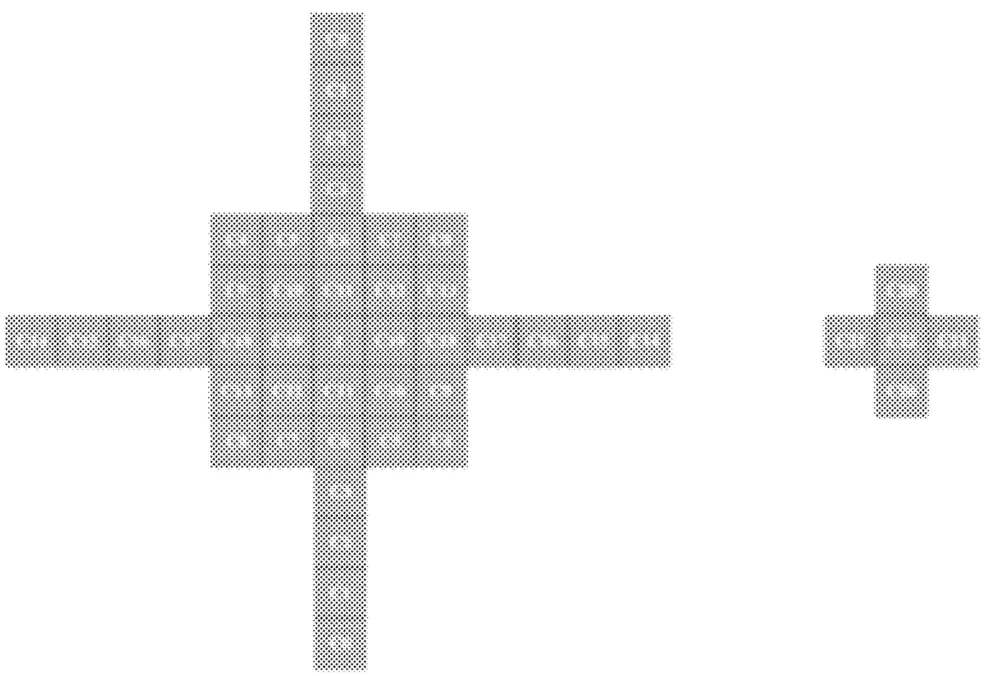
FIG. 19 illustrates an example filter that contains both spatial and extended taps.

In one example, a filter that contains 20 spatial taps and 3 extended taps may be designed as in FIG. 19.

Example 15

Figure 20:
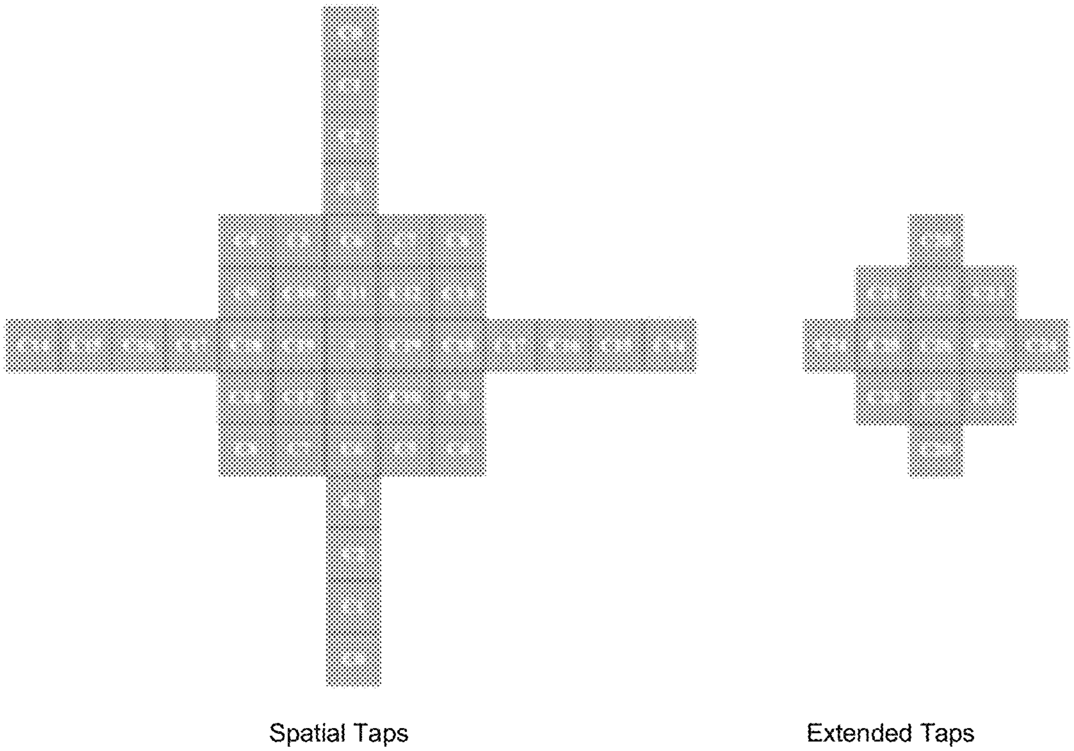
FIG. 20 illustrates an example filter that contains both spatial and extended taps.

In one example, a filter that contains 20 spatial taps and 7 extended taps may be designed as in FIG. 20.

Example 16

Figure 21:
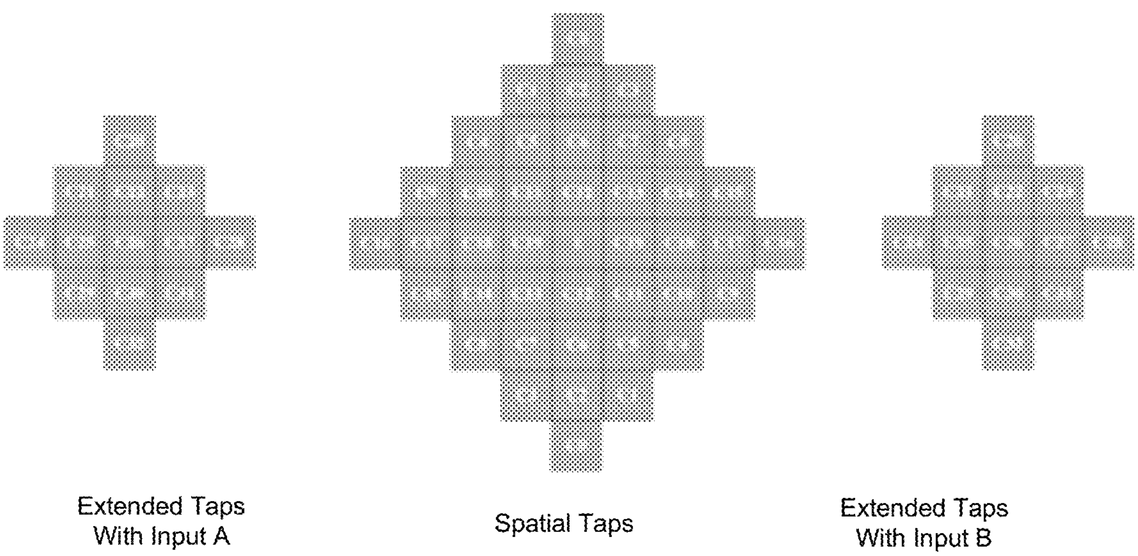
FIG. 21 illustrates an example filter that contains both spatial and extended taps.

In one example, the multiple inputs based symmetrical constrain may be performed on one or more extended taps. In one example, a filter contains 20 spatial taps and 13 extended taps with 2 inputs (e.g., samples inside 2 reference pictures) may be designed as in FIG. 21.

Example 17

Figure 22:
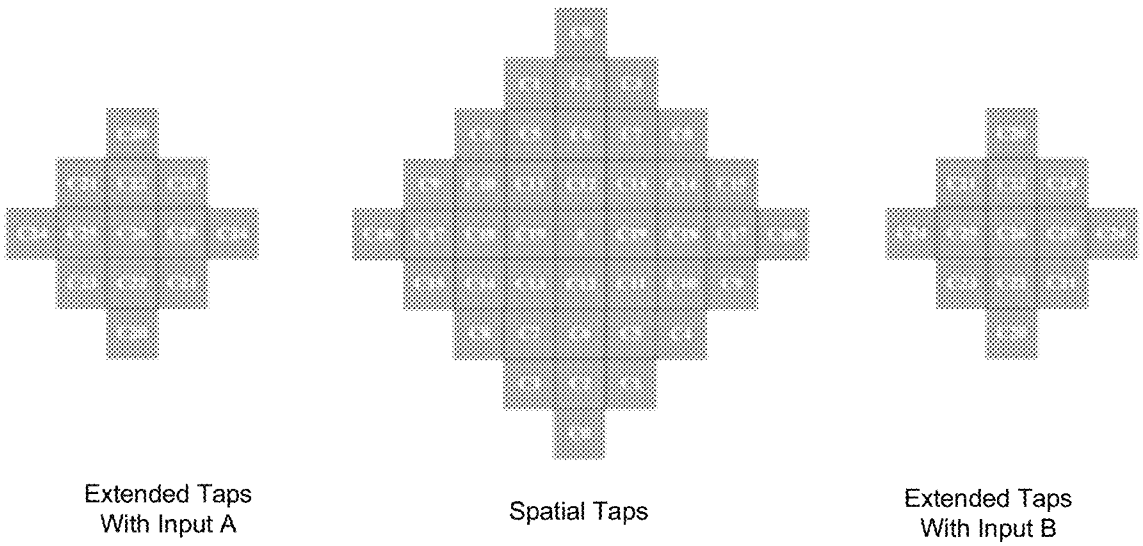
FIG. 22 illustrates an example filter that contains both spatial and extended taps.

In one example, the geometric and multiple inputs based symmetrical constrain may be performed individually. Alternatively, the geometric and multiple inputs based symmetrical constrain may be performed jointly. In one example, a filter contains 20 spatial taps and 7 extended taps with 2 inputs (e.g., samples inside 2 reference pictures) may be designed as in FIG. 22.

Example 18

Figure 23:
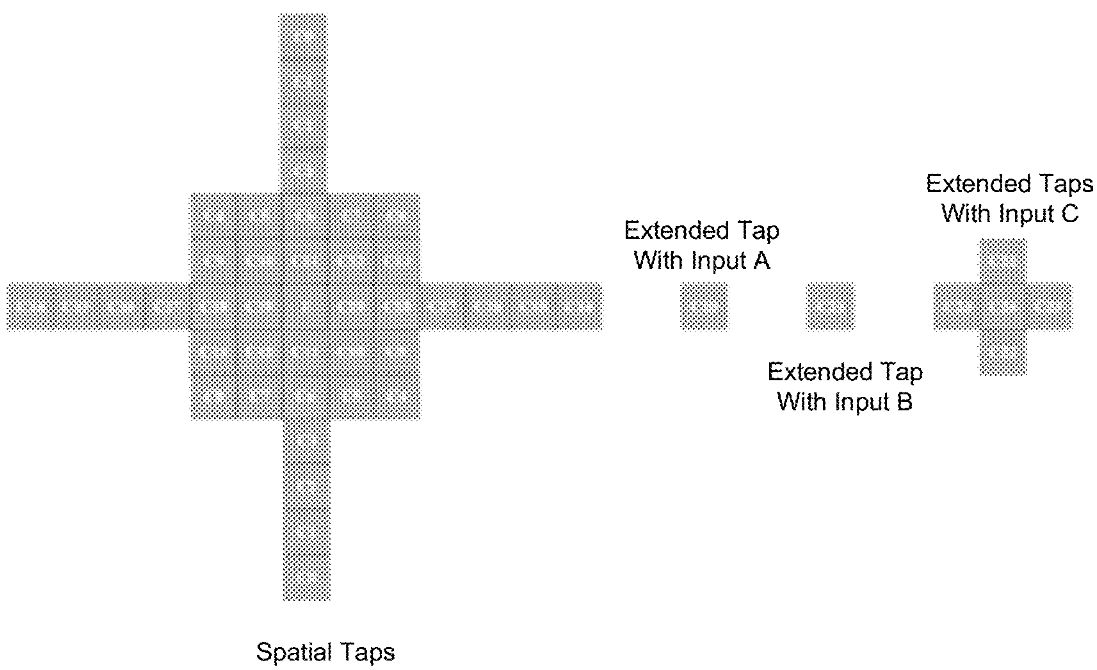
FIG. 23 illustrates an example filter that contains both spatial and extended taps.

In one example, a filter with at least one extended tap may have multiple inputs (e.g., input A, input B and input C) for one or more extended taps. In one example, a filter that contains 20 spatial taps and 5 extended taps may be designed as in FIG. 23.

Example 19

Figure 24:
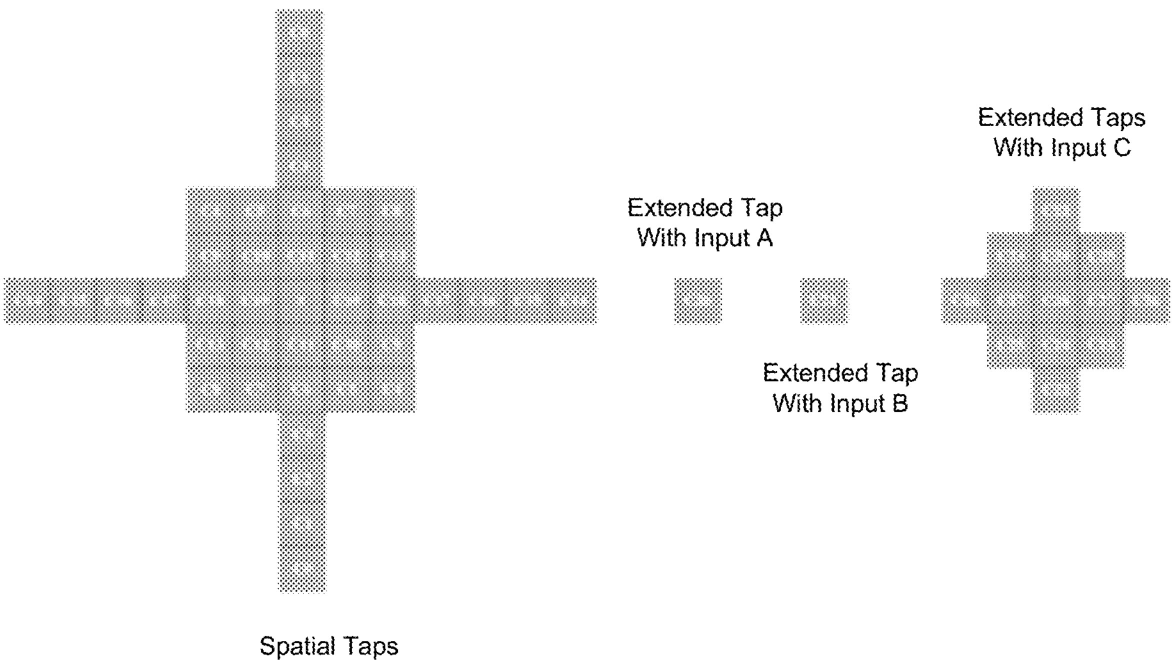
FIG. 24 illustrates an example filter that contains both spatial and extended taps.

In one example, a filter that contains 20 spatial taps and 9 extended taps may be designed as in FIG. 24.

Example 20

Figure 25:
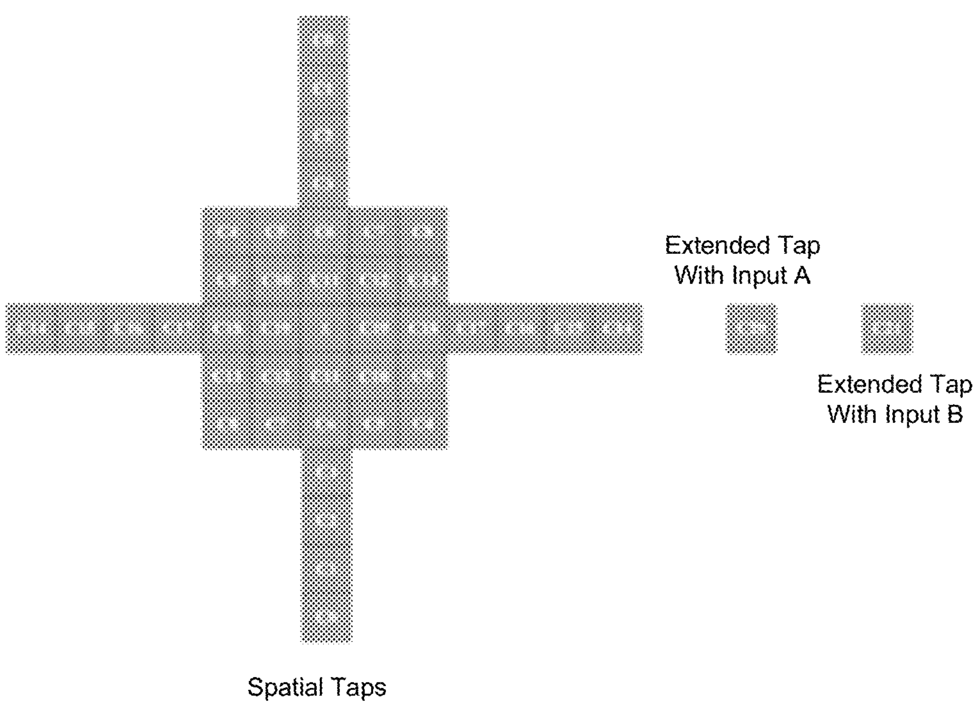
FIG. 25 illustrates an example filter that contains both spatial and extended taps.

In one example, a filter that contains 20 spatial taps and 2 extended taps may be designed as in FIG. 25.

In one example, the total number of extended taps inside a filter may be derived based on the shape, filter length, and/or symmetrical constrain jointly.

Example 21

In one example, a first syntax element may be signaled to indicate whether a filter with at least one extended tap is enabled. In one example, the first syntax element may be coded by arithmetic coding. In one example, the first syntax element may be coded with at least one context. The context may depend on coding information of the current block or neighboring block. The context may depend on the filtering shape of at least one neighboring block. In one example, the first syntax element may be coded with bypass coding. In one example, the first syntax element may be binarized by unary code, or truncated unary code, or fixed-length code, or exponential Golomb code, truncated exponential Golomb code, etc. In one example, the first syntax element may be signaled conditionally. For example, the first syntax element may be signaled only if the extended taps are available. The first syntax element may be coded in a predictive way. The first syntax element may be predicted by the on/off decision of extended taps of at least one neighboring block. The first syntax element may be signaled independently for different color components. Alternatively, the first syntax element may be signaled and shared for different color components. Alternatively, the first syntax element may be signaled for a first color component but not signaled for a second color component.

Example 22

A syntax element structure (such as an APS) may contain one or more filters with at least one extended tap. In one example, the coefficients of extended taps may be contained in an APS. In one example, the clipping parameters of extended taps may be contained in an APS. In one example, the class merging results of extended taps may be contained in an APS. Alternatively, other parameters of extended taps may be contained in an APS.

Example 23

In an example, the intermediate filtering result of a filter is used as input for an extended tap. In one example, the intermediate filtering result of offline-trained ALF filter may be used as input for an extended tap. In one example, the intermediate filtering result of online-trained ALF filter may be used as input for an extended tap. In one example, the intermediate filtering results of other pre-defined filter may be used as input for an extended tap. In one example, the intermediate filtering results of other online-trained filter may be used as input for an extended tap.

Example 24

In an example, the reconstruction samples before or after different coding stages of current frame are used as input for an extended tap. In one example, the reconstruction before/after DBF of current frame may be used as input for an extended tap. In one example, the reconstruction before/after SAO/cross component SAO (CCSAO) of current frame may be used as input for an extended tap. In one example, the reconstruction before/after bilateral filter (BIF) of current frame may be used as input for an extended tap. Alternatively, the reconstruction before/after other stages of current frame may be used as input for an extended tap.

Example 25

In an example, multiple filter shapes may be applied within a video unit. This is denoted as filter shape switch method herein. In one example, for two samples within a video unit, the filter shapes to be applied may be different. In one example, for two CTU/CTBs, the filter shapes to be applied may be different. In one example, for two regions within the video unit (e.g., a slice/tile/subpicture/picture), the filter shapes to be applied may be different. In an example, which filter shape to be selected from the multiple filter shapes may be signaled or inherited or derived on-the-fly. In one example, a filter shape may represent which neighboring samples (adjacent or non-adjacent) to be involved in the filtering process of current sample. In an example, a filter shape may represent how many neighboring samples are involved. Two filtering methods with different filter taps may also be treated as two different filter shapes (even the filter coefficients for certain locations could be treated to be equal to 0). For example, a diamond 5*5 is treated as a different filter shape from diamond 7*7. For example, a diamond 5*5 is treated as a different filter shape from a limited square 5*5 even though filter taps are the same. In one example, a filter with at least one extended tap is treated as a different filter shape from a filter without extended tap. In one example, a filter with N (e.g., N>0) extended tap is treated as a different filter shape from a filter with M (e.g., M>0) extended tap (N may equal or not equal to M). In one example, the filters with at least one extended tap are treated as using a different shape if the shape or length used for one or more spatial taps is different. In one example, the filters with at least one extended tap are treated as using a different shape if the shape or length used for one or more extended taps is different. In one example, the filters with at least one extended tap are treated as using different shapes if both the shape or length used for one or more spatial taps and shape or length used for one or more extended taps is different. In one example, the filters with at least one extended tap are treated as using different shapes if the input of one or more extended taps is different. In one example, indications of filter shapes may be signaled in a bitstream, e.g., in the ALF APS. In an example, for a video unit to be filtered, when the filter coefficients are inherited/predicted from a given ALF APS, the associated filter shape of the ALF APS may be also inherited.

Example 26

In one example, the disclosed filter shape switch method may be applied to any in-loop filtering tools, pre-processing, or post-processing filtering method in video coding (including but not limited to ALF/cross component ALF (CCALF) or any other filtering method). In one example, the disclosed filter shape switch method may be applied to an in-loop filtering method. In one example, the disclosed filter shape switch method may be applied to ALF. In one example, the disclosed filter shape switch method may be applied to CCALF. In an example, the disclosed filter shape switch method may be applied to other in-loop filtering methods. In one example, the disclosed filter shape switch method may be applied to a pre-processing filtering method. In one example, the disclosed filter shape switch method may be applied to a post-processing filtering method.

Example 27

An example first syntax element may be signaled to indicate the filter shape. In one example, the first syntax element may be coded by arithmetic coding. In one example, the first syntax element may be coded with at least one context. The context may depend on coding information of the current block or neighboring block. The context may depend on the filtering shape of at least one neighboring block. In one example, the first syntax element may be coded with bypass coding. In one example, the first syntax element may be binarized by unary code, or truncated unary code, or fixed-length code, or exponential Golomb code, truncated exponential Golomb code, etc. In one example, the first syntax element may be signaled conditionally. For example, the first syntax element may be signaled only if the number of available filter shapes is at least two. The first syntax element may be coded in a predictive way. The first syntax element may be predicted by the filtering shape of at least one neighboring block. The first syntax element may be signaled independently for different color components. In an example, the first syntax element may be signaled and shared for different color components. In an example, the first syntax element may be signaled for a first color component but not signaled for a second color component.

Example 28

In an example, a syntax element structure (such as an APS) may contain filters with one or more filter shapes for different color components. In the following discussion, APS may be used to represent the syntax element structure. In one example, a syntax element structure may contain filters with an identical filter shape. In one example, a shape candidate index may be signaled in a syntax element structure. In one example, the number of enabled filters with the selected filter shape candidate may be signaled in the syntax element structure. In one example, the class merging results of the filters with the selected filter shape candidate may be signaled in the syntax element structure. In one example, the coefficients of filters with the selected filter shape candidate may be signaled in the syntax element structure. In one example, a syntax element structure (such as an APS) may contain filters with different filter shapes. In one example, the filter shape indices of each filter may be signaled. In one example, the filter shape indices of each filter set with different filter shapes may be signaled in the syntax element structure. In one example, the number of enabled filters associated with a filter shape index may be signaled in the syntax element structure. In one example, the number of enabled filters of each filter set that associated with a filter shape index may be signaled in the syntax element structure. In one example, the class merging results may be signaled in the syntax element structure. In one example, the class merging results of each filter set that associated with a filter shape index may be signaled in the syntax element structure. In one example, the coefficients of each enabled filter may be signaled in the syntax element structure. In one example, the coefficients of each filter set that associated with a filter shape index may be signaled in the syntax element structure.

Example 29

Figure 26:
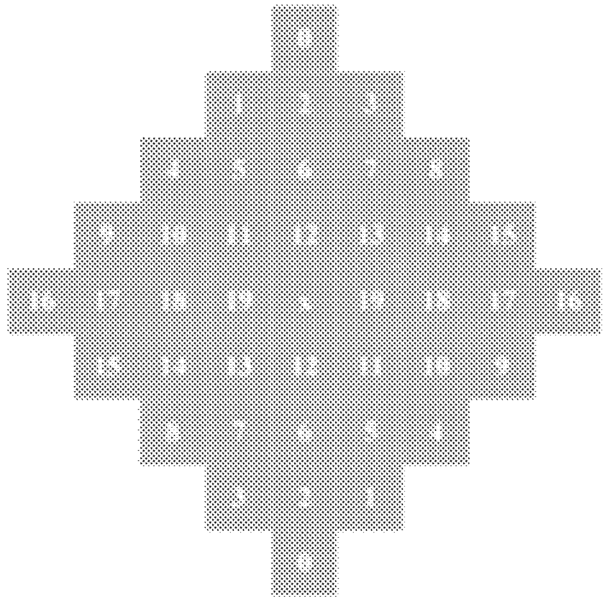
FIG. 26 illustrates an example of a filter shape candidate without extended tap.

In an example, a filter shape switch is achieved between multiple shape candidates. In one example, a shape candidate may not have extended tap. In one example, a candidate shape may use a diamond shape. In one example, a candidate shape may use a cross shape. In one example, a candidate shape may use a square shape. In one example, a candidate shape may use a symmetrical shape. In one example, a candidate shape may use an asymmetrical shape. In one example, a candidate shape without extended tap may be designed as in FIG. 26.

Example 30

Figure 27:
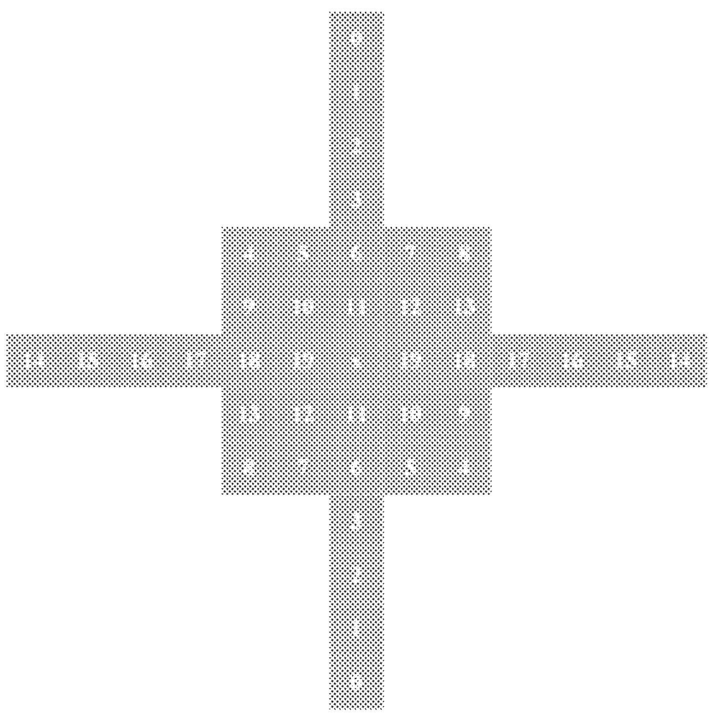
FIG. 27 illustrates an example of a filter shape candidate without extended tap.

In one example, a candidate shape without extended tap may be designed as in FIG. 27.

Example 31

In one example, a shape candidate may have an extended tap. In one example, a candidate shape with at least one extended tap may be designed with the above-mentioned methods. In one example, a candidate shape with at least one extended tap may be designed without the above-mentioned methods. In one example, the filter shape switch may be achieved by a switch between shape candidates without extended tap. In one example, the filter shape switch may be achieved by a switch between the shape candidate shown in FIG. 26 and the shape candidate shown in FIG. 27. In one example, the filter shape switch may be achieved by a switch between one or more shape candidates without extended tap and one or more shape candidates with at least one extended tap. In one example, the filter shape switch may be achieved by a switch between the shape candidate shown in FIG. 27 and the shape candidate shown in FIG. 18. In one example, the filter shape switch may be achieved by a switch between the shape candidate shown in FIG. 27 and the shape candidate shown in FIG. 19. In one example, the filter shape switch may be achieved by a switch between the shape candidate shown in FIG. 27 and the shape candidate shown in FIG. 20. In one example, the filter shape switch may be achieved by a switch between the shape candidate shown in FIG. 27 and the shape candidate shown in FIG. 23. In one example, the filter shape switch may be achieved by a switch between the shape candidate shown in FIG. 27 and the shape candidate shown in FIG. 24. In one example, the filter shape switch may be achieved by a switch between the shape candidate shown in FIG. 27 and the shape candidate shown in FIG. 25. In one example, the filter shape switch may be achieved by a switch between shape candidates with at least one extended tap. In one example, the filter shape switch may be achieved by a switch between the shape candidate shown in FIG. 25 and the shape candidate shown in FIG. 21. In one example, the filter shape switch may be achieved by a switch between the shape candidate shown in FIG. 25 and the shape candidate shown in FIG. 22. In one example, the filter shape switch may be achieved by a switch between the shape candidate shown in FIG. 25 and the shape candidate shown in FIG. 23. In one example, the filter shape switch may be achieved by a switch between the shape candidate shown in FIG. 25 and the shape candidate shown in FIG. 24.

Example 32

In one example, the above-mentioned methods may be used jointly.

Example 33

Alternatively, the above-mentioned methods may be used individually.

Example 34

In one example, the disclosed extended tap method may be applied to any in-loop filtering tools, pre-processing, or post-processing filtering method in video coding (including but not limited to ALF/CCALF or any other filtering method). In one example, the proposed extended taps method may be applied to an in-loop filtering method. In one example, the proposed extended taps method may be applied to ALF. In one example, the proposed extended taps method may be applied to CCALF. Alternatively, the proposed extended taps method may be applied to other in-loop filtering methods. In one example, the proposed extended taps method may be applied to a pre-processing filtering method. In one example, the proposed extended taps method may be applied to a post-processing filtering method.

Example 35

In above examples, the video unit may refer to sequence/picture/sub-picture/slice/tile/coding tree unit (CTU)/CTU row/groups of CTU/coding unit (CU)/prediction unit (PU)/transform unit (TU)/coding tree block (CTB)/coding block (CB)/prediction block (PB)/transform block (TB)/any other region that contains more than one luma or chroma sample/pixel.

Example 36

Whether to and/or how to apply the disclosed methods above may be signaled in a bitstream. In one example, they may be signaled at sequence level/group of pictures level/picture level/slice level/tile group level, such as in sequence header/picture header/SPS/VPS/DPS/decoding capability information (DCI)/PPS/APS/slice header/tile group header. In one example, they may be signaled at PB/TB/CB/PU/TU/CU/virtual pipeline data unit (VPDU)/CTU/CTU row/slice/tile/sub-picture/other kinds of region contain more than one sample or pixel.

Example 37

Whether to and/or how to apply the disclosed methods above may be dependent on coded information, such as block size, color format, single/dual tree partitioning, color component, slice/picture type.

Figure 28:
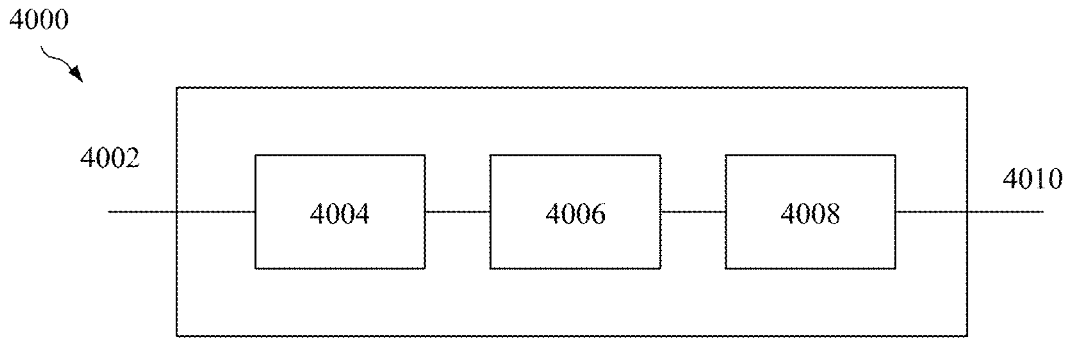
FIG. 28 is a block diagram showing an example video processing system.

FIG. 28 is a block diagram showing an example video processing system 4000 in which various techniques disclosed herein may be implemented. Various implementations may include some or all of the components of the system 4000. The system 4000 may include input 4002 for receiving video content. The video content may be received in a raw or uncompressed format, e.g., 8 or 10 bit multi-component pixel values, or may be in a compressed or encoded format. The input 4002 may represent a network interface, a peripheral bus interface, or a storage interface. Examples of network interface include wired interfaces such as Ethernet, passive optical network (PON), etc. and wireless interfaces such as wireless fidelity (Wi-Fi) or cellular interfaces.

The system 4000 may include a coding component 4004 that may implement the various coding or encoding methods described in the present disclosure. The coding component 4004 may reduce the average bitrate of video from the input 4002 to the output of the coding component 4004 to produce a coded representation of the video. The coding techniques are therefore sometimes called video compression or video transcoding techniques. The output of the coding component 4004 may be either stored, or transmitted via a communication connected, as represented by the component 4006. The stored or communicated bitstream (or coded) representation of the video received at the input 4002 may be used by a component 4008 for generating pixel values or displayable video that is sent to a display interface 4010. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include serial advanced technology attachment (SATA), peripheral component interconnect (PCI), integrated drive electronics (IDE) interface, and the like. The techniques described in the present disclosure may be embodied in various electronic devices such as mobile phones, laptops, smartphones or other devices that are capable of performing digital data processing and/or video display.

Figure 29:
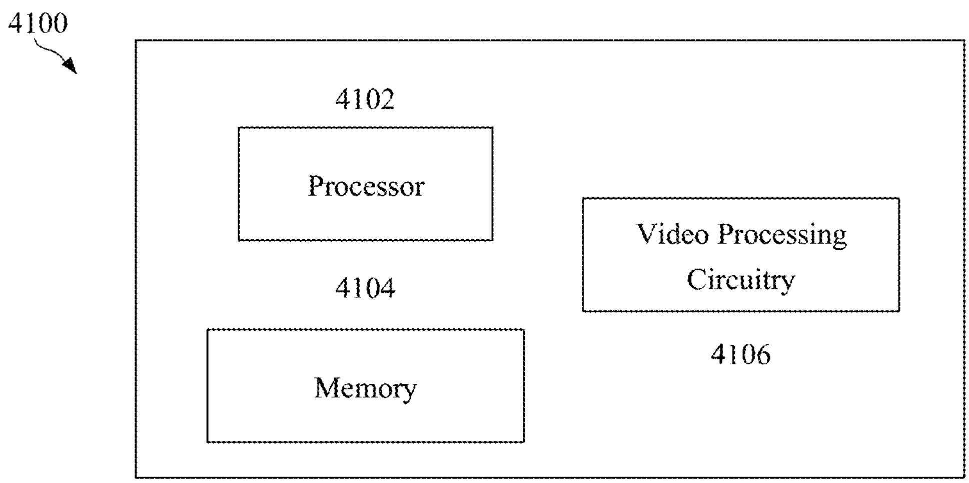
FIG. 29 is a block diagram of an example video processing apparatus.

FIG. 29 is a block diagram of an example video processing apparatus 4100. The apparatus 4100 may be used to implement one or more of the methods described herein. The apparatus 4100 may be embodied in a smartphone, tablet, computer, Internet of Things (IoT) receiver, and so on. The apparatus 4100 may include one or more processors 4102, one or more memories 4104 and video processing circuitry 4106. The processor(s) 4102 may be configured to implement one or more methods described in the present disclosure. The memory (memories) 4104 may be used for storing data and code used for implementing the methods and techniques described herein. The video processing circuitry 4106 may be used to implement, in hardware circuitry, some techniques described in the present disclosure. In some embodiments, the video processing circuitry 4106 may be at least partly included in the processor 4102, e.g., a graphics co-processor.

Figure 30:
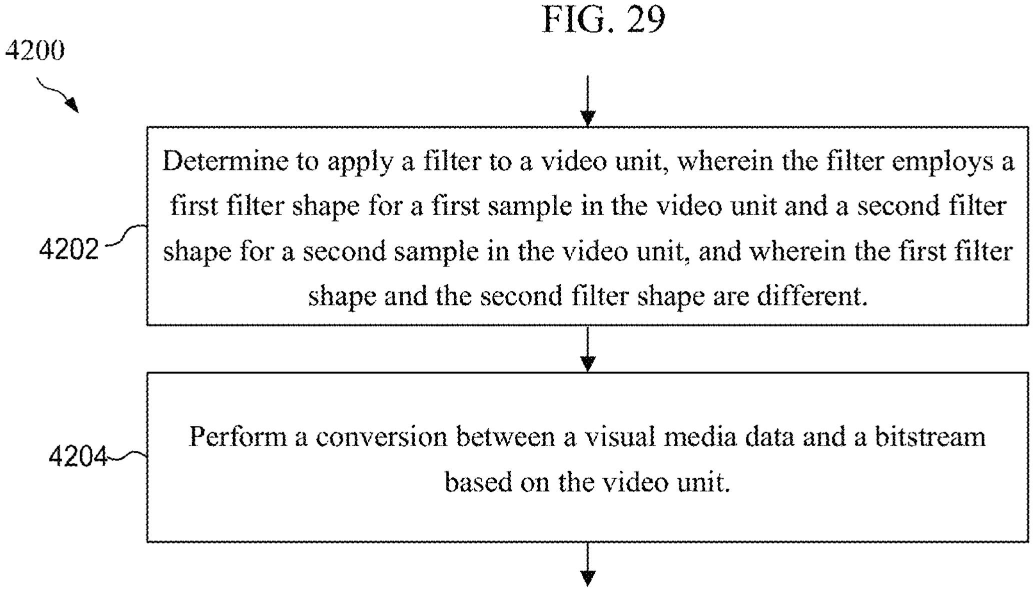
FIG. 30 is a flowchart for an example method of video processing.

FIG. 30 is a flowchart for an example method 4200 of video processing. The method 4200 includes determining to apply a filter to a video unit at step 4202. The filter employs a first filter shape for a first sample in the video unit and a second filter shape for a second sample in the video unit, and the first filter shape and the second filter shape are different. A conversion is performed between a visual media data and a bitstream based on the video unit at step 4204. The conversion of step 4204 may include encoding at an encoder or decoding at a decoder, depending on the example.

It should be noted that the method 4200 can be implemented in an apparatus for processing video data comprising a processor and a non-transitory memory with instructions thereon, such as video encoder 4400, video decoder 4500, and/or encoder 4600. In such a case, the instructions upon execution by the processor, cause the processor to perform the method 4200. Further, the method 4200 can be performed by a non-transitory computer readable medium comprising a computer program product for use by a video coding device. The computer program product comprises computer executable instructions stored on the non-transitory computer readable medium such that when executed by a processor cause the video coding device to perform the method 4200.

Figure 31:
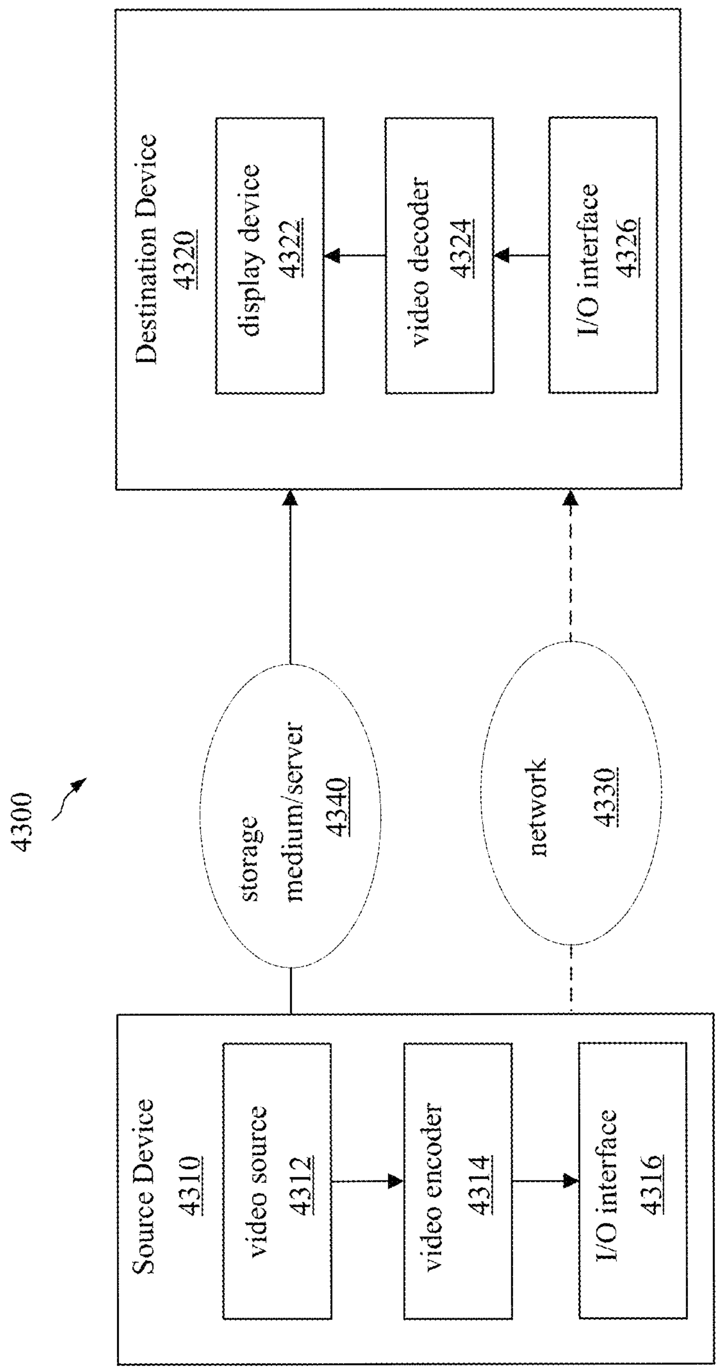
FIG. 31 is a block diagram that illustrates an example video coding system.

FIG. 31 is a block diagram that illustrates an example video coding system 4300 that may utilize the techniques of this disclosure. The video coding system 4300 may include a source device 4310 and a destination device 4320. Source device 4310 generates encoded video data which may be referred to as a video encoding device. Destination device 4320 may decode the encoded video data generated by source device 4310 which may be referred to as a video decoding device.

Source device 4310 may include a video source 4312, a video encoder 4314, and an input/output (I/O) interface 4316. Video source 4312 may include a source such as a video capture device, an interface to receive video data from a video content provider, and/or a computer graphics system for generating video data, or a combination of such sources. The video data may comprise one or more pictures. Video encoder 4314 encodes the video data from video source 4312 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 4316 may include a modulator/demodulator (modem) and/or a transmitter. The encoded video data may be transmitted directly to destination device 4320 via I/O interface 4316 through network 4330. The encoded video data may also be stored onto a storage medium/server 4340 for access by destination device 4320.

Destination device 4320 may include an I/O interface 4326, a video decoder 4324, and a display device 4322. I/O interface 4326 may include a receiver and/or a modem. I/O interface 4326 may acquire encoded video data from the source device 4310 or the storage medium/server 4340. Video decoder 4324 may decode the encoded video data. Display device 4322 may display the decoded video data to a user. Display device 4322 may be integrated with the destination device 4320, or may be external to destination device 4320, which can be configured to interface with an external display device.

Video encoder 4314 and video decoder 4324 may operate according to a video compression standard, such as the High Efficiency Video Coding (HEVC) standard, Versatile Video Coding (VVC) standard and other current and/or further standards.

Figure 32:
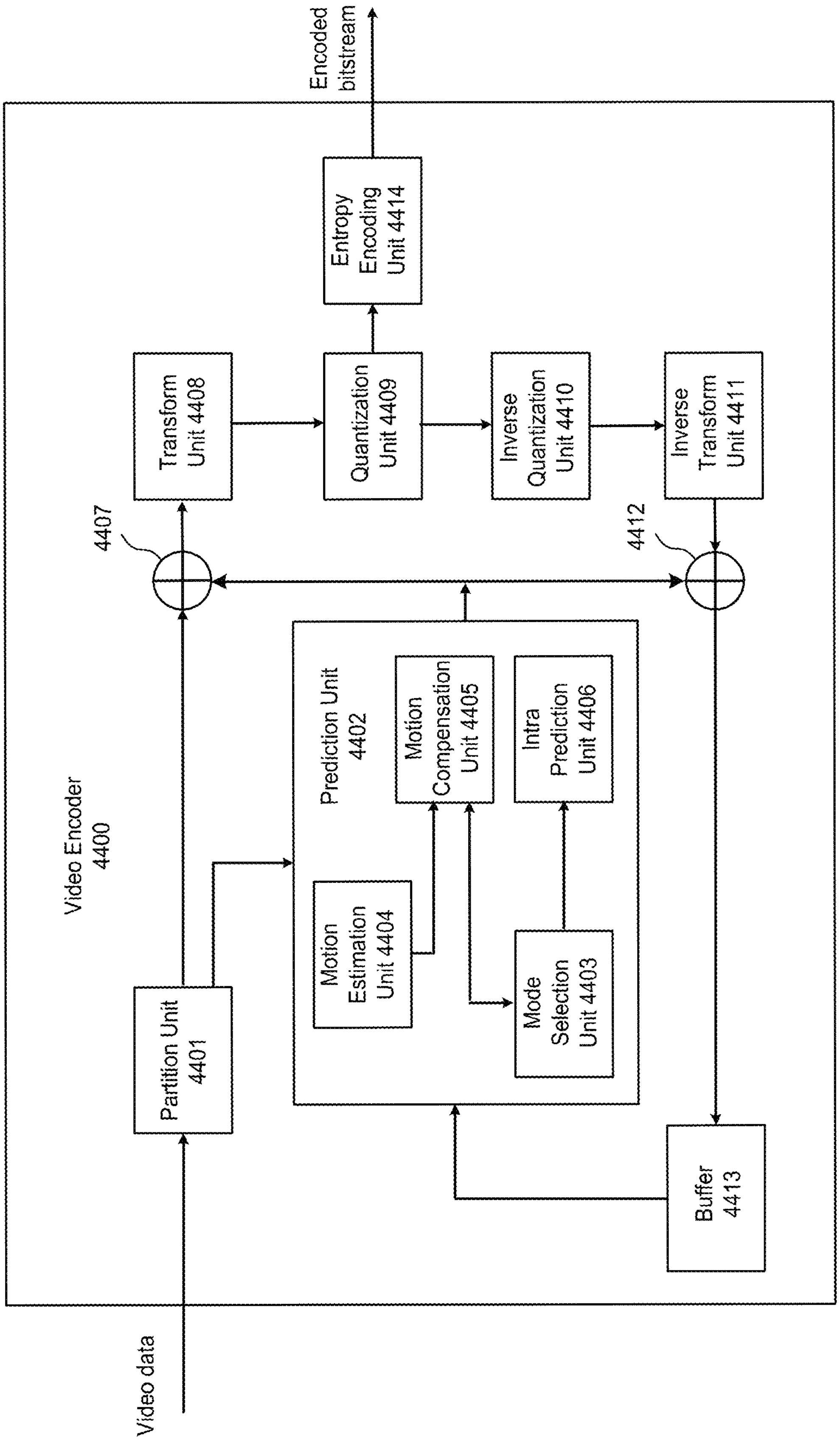
FIG. 32 is a block diagram that illustrates an example encoder.

FIG. 32 is a block diagram illustrating an example of video encoder 4400, which may be video encoder 4314 in the system 4300 illustrated in FIG. 31. Video encoder 4400 may be configured to perform any or all of the techniques of this disclosure. The video encoder 4400 includes a plurality of functional components. The techniques described in this disclosure may be shared among the various components of video encoder 4400. In some examples, a processor may be configured to perform any or all of the techniques described in this disclosure.

The functional components of video encoder 4400 may include a partition unit 4401, a prediction unit 4402 which may include a mode select unit 4403, a motion estimation unit 4404, a motion compensation unit 4405, an intra prediction unit 4406, a residual generation unit 4407, a transform processing unit 4408, a quantization unit 4409, an inverse quantization unit 4410, an inverse transform unit 4411, a reconstruction unit 4412, a buffer 4413, and an entropy encoding unit 4414.

In other examples, video encoder 4400 may include more, fewer, or different functional components. In an example, prediction unit 4402 may include an intra block copy (IBC) unit. The IBC unit may perform prediction in an IBC mode in which at least one reference picture is a picture where the current video block is located.

Furthermore, some components, such as motion estimation unit 4404 and motion compensation unit 4405 may be highly integrated, but are represented in the example of video encoder 4400 separately for purposes of explanation.

Partition unit 4401 may partition a picture into one or more video blocks. Video encoder 4400 and video decoder 4500 may support various video block sizes.

Mode select unit 4403 may select one of the coding modes, intra or inter, e.g., based on error results, and provide the resulting intra or inter coded block to a residual generation unit 4407 to generate residual block data and to a reconstruction unit 4412 to reconstruct the encoded block for use as a reference picture. In some examples, mode select unit 4403 may select a combination of intra and inter prediction (CIIP) mode in which the prediction is based on an inter prediction signal and an intra prediction signal. Mode select unit 4403 may also select a resolution for a motion vector (e.g., a sub-pixel or integer pixel precision) for the block in the case of inter prediction.

To perform inter prediction on a current video block, motion estimation unit 4404 may generate motion information for the current video block by comparing one or more reference frames from buffer 4413 to the current video block. Motion compensation unit 4405 may determine a predicted video block for the current video block based on the motion information and decoded samples of pictures from buffer 4413 other than the picture associated with the current video block.

Motion estimation unit 4404 and motion compensation unit 4405 may perform different operations for a current video block, for example, depending on whether the current video block is in an I slice, a P slice, or a B slice.

In some examples, motion estimation unit 4404 may perform uni-directional prediction for the current video block, and motion estimation unit 4404 may search reference pictures of list 0 or list 1 for a reference video block for the current video block. Motion estimation unit 4404 may then generate a reference index that indicates the reference picture in list 0 or list 1 that contains the reference video block and a motion vector that indicates a spatial displacement between the current video block and the reference video block. Motion estimation unit 4404 may output the reference index, a prediction direction indicator, and the motion vector as the motion information of the current video block. Motion compensation unit 4405 may generate the predicted video block of the current block based on the reference video block indicated by the motion information of the current video block.

In other examples, motion estimation unit 4404 may perform bi-directional prediction for the current video block, motion estimation unit 4404 may search the reference pictures in list 0 for a reference video block for the current video block and may also search the reference pictures in list 1 for another reference video block for the current video block. Motion estimation unit 4404 may then generate reference indexes that indicate the reference pictures in list 0 and list 1 containing the reference video blocks and motion vectors that indicate spatial displacements between the reference video blocks and the current video block. Motion estimation unit 4404 may output the reference indexes and the motion vectors of the current video block as the motion information of the current video block. Motion compensation unit 4405 may generate the predicted video block of the current video block based on the reference video blocks indicated by the motion information of the current video block.

In some examples, motion estimation unit 4404 may output a full set of motion information for decoding processing of a decoder. In some examples, motion estimation unit 4404 may not output a full set of motion information for the current video. Rather, motion estimation unit 4404 may signal the motion information of the current video block with reference to the motion information of another video block. For example, motion estimation unit 4404 may determine that the motion information of the current video block is sufficiently similar to the motion information of a neighboring video block.

In one example, motion estimation unit 4404 may indicate, in a syntax structure associated with the current video block, a value that indicates to the video decoder 4500 that the current video block has the same motion information as another video block.

In another example, motion estimation unit 4404 may identify, in a syntax structure associated with the current video block, another video block and a motion vector difference (MVD). The motion vector difference indicates a difference between the motion vector of the current video block and the motion vector of the indicated video block. The video decoder 4500 may use the motion vector of the indicated video block and the motion vector difference to determine the motion vector of the current video block.

As discussed above, video encoder 4400 may predictively signal the motion vector. Two examples of predictive signaling techniques that may be implemented by video encoder 4400 include advanced motion vector prediction (AMVP) and merge mode signaling.

Intra prediction unit 4406 may perform intra prediction on the current video block. When intra prediction unit 4406 performs intra prediction on the current video block, intra prediction unit 4406 may generate prediction data for the current video block based on decoded samples of other video blocks in the same picture. The prediction data for the current video block may include a predicted video block and various syntax elements.

Residual generation unit 4407 may generate residual data for the current video block by subtracting the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and residual generation unit 4407 may not perform the subtracting operation.

Transform processing unit 4408 may generate one or more transform coefficient video blocks for the current video block by applying one or more transforms to a residual video block associated with the current video block.

After transform processing unit 4408 generates a transform coefficient video block associated with the current video block, quantization unit 4409 may quantize the transform coefficient video block associated with the current video block based on one or more quantization parameter (QP) values associated with the current video block.

Inverse quantization unit 4410 and inverse transform unit 4411 may apply inverse quantization and inverse transforms to the transform coefficient video block, respectively, to reconstruct a residual video block from the transform coefficient video block. Reconstruction unit 4412 may add the reconstructed residual video block to corresponding samples from one or more predicted video blocks generated by the prediction unit 4402 to produce a reconstructed video block associated with the current block for storage in the buffer 4413.

After reconstruction unit 4412 reconstructs the video block, the loop filtering operation may be performed to reduce video blocking artifacts in the video block.

Entropy encoding unit 4414 may receive data from other functional components of the video encoder 4400. When entropy encoding unit 4414 receives the data, entropy encoding unit 4414 may perform one or more entropy encoding operations to generate entropy encoded data and output a bitstream that includes the entropy encoded data.

Figure 33:
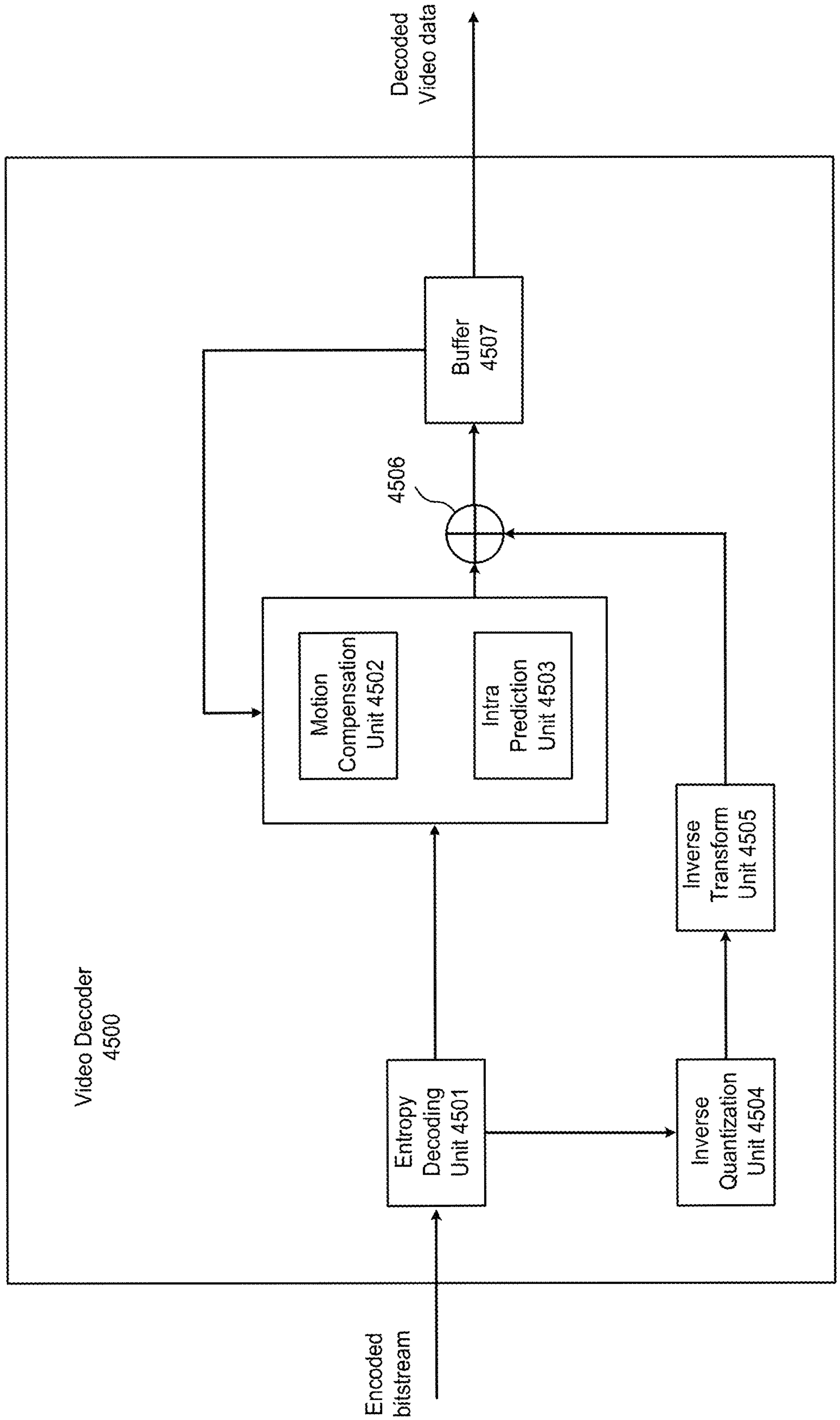
FIG. 33 is a block diagram that illustrates an example decoder.

FIG. 33 is a block diagram illustrating an example of video decoder 4500 which may be video decoder 4324 in the system 4300 illustrated in FIG. 31. The video decoder 4500 may be configured to perform any or all of the techniques of this disclosure. In the example shown, the video decoder 4500 includes a plurality of functional components. The techniques described in this disclosure may be shared among the various components of the video decoder 4500. In some examples, a processor may be configured to perform any or all of the techniques described in this disclosure.

In the example shown, video decoder 4500 includes an entropy decoding unit 4501, a motion compensation unit 4502, an intra prediction unit 4503, an inverse quantization unit 4504, an inverse transformation unit 4505, a reconstruction unit 4506, and a buffer 4507. Video decoder 4500 may, in some examples, perform a decoding pass generally reciprocal to the encoding pass described with respect to video encoder 4400.

Entropy decoding unit 4501 may retrieve an encoded bitstream. The encoded bitstream may include entropy coded video data (e.g., encoded blocks of video data). Entropy decoding unit 4501 may decode the entropy coded video data, and from the entropy decoded video data, motion compensation unit 4502 may determine motion information including motion vectors, motion vector precision, reference picture list indexes, and other motion information. Motion compensation unit 4502 may, for example, determine such information by performing the AMVP and merge mode.

Motion compensation unit 4502 may produce motion compensated blocks, possibly performing interpolation based on interpolation filters. Identifiers for interpolation filters to be used with sub-pixel precision may be included in the syntax elements.

Motion compensation unit 4502 may use interpolation filters as used by video encoder 4400 during encoding of the video block to calculate interpolated values for sub-integer pixels of a reference block. Motion compensation unit 4502 may determine the interpolation filters used by video encoder 4400 according to received syntax information and use the interpolation filters to produce predictive blocks.

Motion compensation unit 4502 may use some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter coded block, and other information to decode the encoded video sequence.

Intra prediction unit 4503 may use intra prediction modes for example received in the bitstream to form a prediction block from spatially adjacent blocks. Inverse quantization unit 4504 inverse quantizes, i.e., de-quantizes, the quantized video block coefficients provided in the bitstream and decoded by entropy decoding unit 4501. Inverse transform unit 4505 applies an inverse transform.

Reconstruction unit 4506 may sum the residual blocks with the corresponding prediction blocks generated by motion compensation unit 4502 or intra prediction unit 4503 to form decoded blocks. If desired, a deblocking filter may also be applied to filter the decoded blocks in order to remove blockiness artifacts. The decoded video blocks are then stored in buffer 4507, which provides reference blocks for subsequent motion compensation/intra prediction and also produces decoded video for presentation on a display device.

Figure 34:
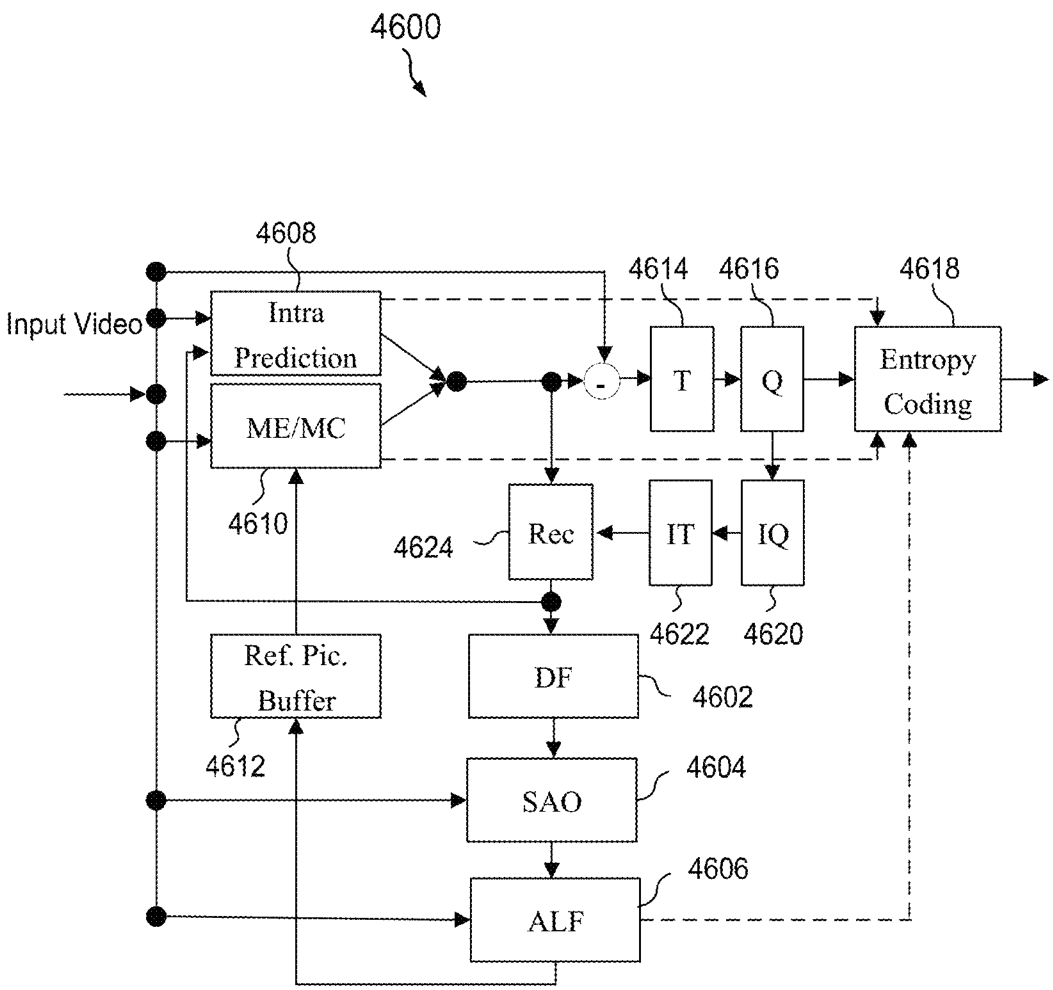
FIG. 34 is a schematic diagram of an example encoder.

FIG. 34 is a schematic diagram of an example encoder 4600. The encoder 4600 is suitable for implementing the techniques of VVC. The encoder 4600 includes three in-loop filters, namely a deblocking filter (DF) 4602, a sample adaptive offset (SAO) 4604, and an adaptive loop filter (ALF) 4606. Unlike the DF 4602, which uses predefined filters, the SAO 4604 and the ALF 4606 utilize the original samples of the current picture to reduce the mean square errors between the original samples and the reconstructed samples by adding an offset and by applying a finite impulse response (FIR) filter, respectively, with coded side information signaling the offsets and filter coefficients. The ALF 4606 is located at the last processing stage of each picture and can be regarded as a tool trying to catch and fix artifacts created by the previous stages.

The encoder 4600 further includes an intra prediction component 4608 and a motion estimation/compensation (ME/MC) component 4610 configured to receive input video. The intra prediction component 4608 is configured to perform intra prediction, while the ME/MC component 4610 is configured to utilize reference pictures obtained from a reference picture buffer 4612 to perform inter prediction. Residual blocks from inter prediction or intra prediction are fed into a transform (T) component 4614 and a quantization (Q) component 4616 to generate quantized residual transform coefficients, which are fed into an entropy coding component 4618. The entropy coding component 4618 entropy codes the prediction results and the quantized transform coefficients and transmits the same toward a video decoder (not shown). Quantization components output from the quantization component 4616 may be fed into an inverse quantization (IQ) components 4620, an inverse transform component 4622, and a reconstruction (REC) component 4624. The REC component 4624 is able to output images to the DF 4602, the SAO 4604, and the ALF 4606 for filtering prior to those images being stored in the reference picture buffer 4612.

Figure 35:
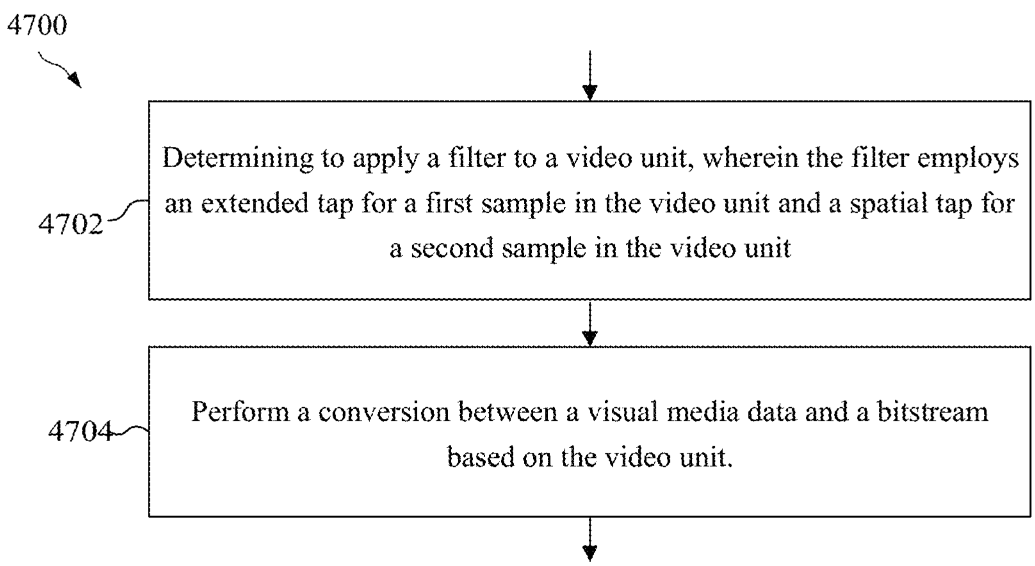
FIG. 35 is a flowchart for another example method of video processing.

FIG. 35 is a flowchart for another example method 4700 of video processing. The method 4700 includes determining to apply a filter to a video unit at step 4702. The filter employs an extended tap for a first sample in the video unit and a spatial tap for a second sample in the video unit. A conversion is performed between a visual media data and a bitstream based on the video unit at step 4204. The conversion of step 4704 may include encoding at an encoder or decoding at a decoder, depending on the example.

It should be noted that the method 4700 can be implemented in an apparatus for processing video data comprising one or more processors and one or more non-transitory memories with instructions thereon, such as video encoder 4400, video decoder 4500, and/or encoder 4600. In such a case, the instructions upon execution by the one or more processors, cause the one or more processors to perform the method 4700. Further, the method 4700 can be performed by a non-transitory computer readable medium comprising a computer program product for use by a video coding device. The computer program product comprises computer executable instructions stored on the non-transitory computer readable medium such that, when executed by one or more processors, cause the video coding device to perform the method 4700.

A listing of solutions preferred by some examples is provided next.

The following solutions show examples of techniques discussed herein.

1. A method for processing video data (e.g., method 4200 depicted in FIG. 30) comprising: determining (4202) to apply a filter to a video unit, wherein the filter employs a first filter shape for a first sample in the video unit and a second filter shape for a second sample in the video unit, and wherein the first filter shape and the second filter shape are different; and performing (4204) a conversion between a visual media data and a bitstream based on the video unit.
2. The method of solution 1, wherein the first sample is in a first region of the video unit and the second samples is a second region of the video unit, and wherein the first region and second region are different coding tree units (CTUs), different slices, different tiles, different sub-pictures, or combinations thereof.
3. The method of any of solutions 1-2, wherein the first filter shape specifies a first group of neighboring samples involved in filtering the first sample, and wherein the second filter shape specifies a second group of neighboring samples involved in filtering the second sample.
4. The method of any of solutions 1-3, wherein the first filter shape has a different number of filter taps than the second filter shape.

5. The method of any of solutions 1-4, wherein the first filter shape has a different length than the second filter shape.
6. The method of any of solutions 1-5, wherein the first filter shape has a first extended tap, wherein the second filter shape has a second extended tap, and wherein the first extended tap receives different input than the second extended tap.
7. The method of any of solutions 1-6, wherein an indication of the first filter shape and the second filter shape are included in an adaptation parameter set (APS) in the bitstream.
8. The method of any of solutions 1-7, wherein an indication of the first filter shape is coded according to arithmetic coding, context coding, bypass coding, conditional coding, predictive coding, unary code, truncated unary code, fixed length code, exponential Golomb code, truncated exponential Golomb code, or combinations thereof.
9. The method of any of solutions 1-8, wherein an indication of the first filter shape is coded independently for a plurality of color components.
10. The method of any of solutions 1-9, wherein the filter is applied as an in-loop filter, a pre-processing filter, a post-processing filter, or combinations thereof.
11. The method of any of solutions 1-10, wherein the filter is an adaptive loop filter (ALF).
12. The method of any of solutions 1-11, wherein an indication of filter shape candidate index, a number of enabled filters, class merging results, filter coefficients, or combinations thereof are included in a parameter set in the bitstream.
13 The method of any of solutions 1-12, wherein at least one of the first filter shape and the second filter shape are indicated in the bitstream as a candidate shape, and wherein the candidate shape includes a diamond shape, a cross shape, a square shape, a symmetrical shape, an asymmetrical shape, a shape with an extended tap, a shape without an extended tap, or combinations thereof.
14. The method of any of solutions 1-13, wherein the filter includes a plurality of filter lengths.
15. The method of any of solutions 1-14, wherein the filter includes at least one of an extended tap and a spatial tap.
16. The method of any of solutions 1-15, wherein a coefficient resulting from application of the extended tap corresponds to one or more inputs.
17. The method of any of solutions 1-16, wherein the filter is trained by training data that is collected jointly between the extended tap and the spatial tap.
18. The method of any of solutions 1-17, wherein the extended tap and the spatial tap are trained jointly.
19. The method of any of solutions 1-18, wherein a parameter of the extended tap is derived jointly with a parameter of and the spatial tap.
20. The method of any of solutions 1-19, wherein the conversion includes encoding the visual media data into the bitstream.
21. The method of any of solutions 1-19, wherein the conversion includes decoding the visual media data from the bitstream.
22. An apparatus for processing video data comprising: a processor; and a non-transitory memory with instructions thereon, wherein the instructions upon execution by the processor, cause the processor to perform the method of any of solutions 1-21.
23. A non-transitory computer readable medium comprising a computer program product for use by a video coding device, the computer program product comprising computer executable instructions stored on the non-transitory computer readable medium such that when executed by a processor cause the video coding device to perform the method of any of solutions 1-21.
24. A non-transitory computer-readable recording medium storing a bitstream of a video which is generated by a method performed by a video processing apparatus, wherein the method comprises: determining to filter a video unit, wherein the filter employs a first filter shape for a first sample in the video unit and a second filter shape for a second sample in the video unit, and wherein the first filter shape and the second filter shape are different; and generating a bitstream based on the determining.
25. A method for storing bitstream of a video comprising: determining to filter a video unit, wherein the filter employs a first filter shape for a first sample in the video unit and a second filter shape for a second sample in the video unit, and wherein the first filter shape and the second filter shape are different; generating a bitstream based on the determining; and storing the bitstream in a non-transitory computer-readable recording medium.
26. A method for storing bitstream of a video, comprising: determining to apply a filter to a video unit, wherein the filter employs an extended tap for a first sample in the video unit and a spatial tap for a second sample in the video unit; generating the bitstream based on the determining; and storing the bitstream in a non-transitory computer-readable recording medium.
27. A method, apparatus or system described in the present disclosure.

In the solutions described herein, an encoder may conform to the format rule by producing a coded representation according to the format rule. In the solutions described herein, a decoder may use the format rule to parse syntax elements in the coded representation with the knowledge of presence and absence of syntax elements according to the format rule to produce decoded video.

In the present disclosure, the term "video processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream. Furthermore, during conversion, a decoder may parse a bitstream with the knowledge that some fields may be present, or absent, based on the determination, as is described in the above solutions. Similarly, an encoder may determine that certain syntax fields are or are not to be included and generate the coded representation accordingly by including or excluding the syntax fields from the coded representation.

The disclosed and other solutions, examples, embodiments, modules and the functional operations described in this disclosure can be implemented in digital electronic circuitry, or in computer software, firmware, or hardware, including the structures disclosed in this disclosure and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform functions by operating on input data and generating output. The processes and logic flows can also be performed by, and apparatus can also be implemented as, special purpose logic circuitry, e.g., a field programmable gate array (FPGA) or an application specific integrated circuit (ASIC).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto optical disks; and compact disc read-only memory (CD ROM) and Digital versatile disc-read only memory (DVD-ROM) disks. The processor and the memory can be supplemented by, or incorporated in, special purpose logic circuitry.

While the present disclosure contains many specifics, these should not be construed as limitations on the scope of any subject matter or of what may be claimed, but rather as descriptions of features that may be specific to particular embodiments of particular techniques. Certain features that are described in the present disclosure in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

Only a few implementations and examples are described and other implementations, enhancements and variations can be made based on what is described and illustrated in the present disclosure.

A first component is directly coupled to a second component when there are no intervening components, except for a line, a trace, or another medium between the first component and the second component. The first component is indirectly coupled to the second component when there are intervening components other than a line, a trace, or another medium between the first component and the second component. The term "coupled" and its variants include both directly coupled and indirectly coupled. The use of the term "about" means a range including ±10% of the subsequent number unless otherwise stated.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled may be directly connected or may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method for processing video data comprising:

determining to apply a filter to a video unit, wherein the filter employs an extended tap for a first sample in the video unit and a spatial tap for a second sample in the video unit; and performing a conversion between a visual media data and a bitstream based on the video unit.

2. The method of claim 1, wherein the extended tap is applied to only luma components of the first sample.

3. The method of claim 1, wherein a shape of the spatial tap comprises a cross shape.

4. The method of claim 1, wherein a shape of the extended tap comprises a diamond shape.

5. The method of claim 1, wherein a shape of the extended tap comprises a cross shape.

6. The method of claim 1, wherein the extended tap is a first extended tap, wherein the filter employs a second extended tap, and wherein the first extended tap receives different input than the second extended tap.

7. The method of claim 1, wherein the filter comprises 20 spatial taps and 5 extended taps.

8. The method of claim 1, wherein the filter comprises 20 spatial taps and 9 extended taps.

9. The method of claim 1, wherein the filter comprises 20 spatial taps and 2 extended taps.

10. The method of claim 1, wherein a first syntax element is signaled to indicate whether at least one extended tap inside the filter is enabled.

11. The method of claim 10, wherein the first syntax element is binarized by unary code, or truncated unary code, or fixed-length code, or exponential Golomb code, or truncated exponential Golomb code.

12. The method of claim 1, further comprising using an intermediate filtering result as an input for the extended tap, wherein the intermediate filtering result comprises result of an offline-trained filter of an adaptive loop filter.

13. The method of claim 1, wherein an applied filter shape is different for a first coding tree unit (CTU) or coding tree block (CTB) than for a second CTU or CTB.

14. The method of claim 1, wherein a syntax element structure contains indications of shapes of the extended tap and/or the spatial tap.

15. The method of claim 14, wherein the syntax element structure signals:

a number of enabled filters with a selected filter shape candidate;

class merging results of the filters with the selected filter shape candidate; or coefficients and parameters of filters with the selected filter shape candidate.

16. The method of claim 1, wherein the conversion includes encoding the visual media data into the bitstream.

17. The method of claim 1, wherein the conversion includes decoding the visual media data from the bitstream.

18. An apparatus for processing video data comprising:

one or more processors; and one or more non-transitory memories coupled to the one or more processor and storing instructions thereon that, when executed by the one or more processors, cause the apparatus to be configured to:

determine to apply a filter to a video unit, wherein the filter employs an extended tap for a first sample in the video unit and a spatial tap for a second sample in the video unit; and perform a conversion between a visual media data and a bitstream based on the video unit.

19. A non-transitory computer-readable storage medium storing instructions that cause a processor to:

determine to apply a filter to a video unit, wherein the filter employs an extended tap for a first sample in the video unit and a spatial tap for a second sample in the video unit; and perform a conversion between a visual media data and a bitstream based on the video unit.

20. A non-transitory computer-readable recording medium storing a bitstream of a video that is generated by a method performed by a video processing apparatus, wherein the method comprises:

determining to apply a filter to a video unit, wherein the filter employs an extended tap for a first sample in the video unit and a spatial tap for a second sample in the video unit; and generating the bitstream based on the determining.

* * * * *